US011947472B2

(12) United States Patent
Shah et al.

(10) Patent No.: US 11,947,472 B2
(45) Date of Patent: Apr. 2, 2024

(54) COMPOSABLE INFRASTRUCTURE ENABLED BY HETEROGENEOUS ARCHITECTURE, DELIVERED BY CXL BASED CACHED SWITCH SOC

(71) Applicant: AVAGO TECHNOLOGIES INTERNATIONAL SALES PTE. LIMITED, San Jose, CA (US)

(72) Inventors: Shreyas Shah, San Jose, CA (US); George Apostol, Jr., Los Gatos, CA (US); Nagarajan Subramaniyan, San Jose, CA (US); Jack Regula, Durham, NC (US); Jeffrey S. Earl, San Jose, CA (US)

(73) Assignee: Avago Technologies International Sales Pte. Limited, Singapore (SG)

(*) Notice: Subject to any disclaimer, the term of this patent is extended or adjusted under 35 U.S.C. 154(b) by 0 days.

(21) Appl. No.: 17/809,510

(22) Filed: Jun. 28, 2022

(65) Prior Publication Data
US 2023/0017583 A1    Jan. 19, 2023

Related U.S. Application Data

(60) Provisional application No. 63/223,045, filed on Jul. 18, 2021.

(51) Int. Cl.
*G06F 13/16* (2006.01)
*G06F 12/06* (2006.01)
(Continued)

(52) U.S. Cl.
CPC ...... *G06F 13/1668* (2013.01); *G06F 12/0646* (2013.01); *G06F 12/0815* (2013.01);
(Continued)

(58) Field of Classification Search
CPC ............ G06F 12/0646; G06F 12/0815; G06F 12/0837; G06F 12/0862; G06F 12/0868;
(Continued)

(56) References Cited

U.S. PATENT DOCUMENTS 11,388,268 B1   7/2022   Siva et al.
11,573,898 B2   2/2023   Passint et al.
(Continued)

OTHER PUBLICATIONS

"FlexPod Datacenter with Citrix VDI and VMware vSphere 7 for up to 2500 Seats", Cisco, Published Apr. 2022, http://www.cisco.com/go/designzone, 497 pages.
(Continued)

*Primary Examiner* — Eric T Oberly
(74) *Attorney, Agent, or Firm* — Foley & Lardner LLP

(57) ABSTRACT

Described herein are systems, methods, and products utilizing a cache coherent switch on chip. The cache coherent switch on chip may utilize Compute Express Link (CXL) interconnect open standard and allow for multi-host access and the sharing of resources. The cache coherent switch on chip provides for resource sharing between components while independent of a system processor, removing the system processor as a bottleneck. Cache coherent switch on chip may further allow for cache coherency between various different components. Thus, for example, memories, accelerators, and/or other components within the disclose systems may each maintain caches, and the systems and techniques described herein allow for cache coherency between the different components of the system with minimal latency.

20 Claims, 19 Drawing Sheets

(51) Int. Cl.
| | |
|---|---|
| *G06F 12/0815* | (2016.01) |
| *G06F 12/0837* | (2016.01) |
| *G06F 12/0862* | (2016.01) |
| *G06F 12/0868* | (2016.01) |
| *G06F 12/14* | (2006.01) |
| *G06F 13/40* | (2006.01) |
| *G06F 13/42* | (2006.01) |
| *G06N 20/00* | (2019.01) |

(52) U.S. Cl.
CPC ...... *G06F 12/0837* (2013.01); *G06F 12/0862* (2013.01); *G06F 12/0868* (2013.01); *G06F 12/1466* (2013.01); *G06F 13/1642* (2013.01); *G06F 13/1673* (2013.01); *G06F 13/4022* (2013.01); *G06F 13/4221* (2013.01); *G06F 2213/0026* (2013.01); *G06N 20/00* (2019.01)

(58) Field of Classification Search
CPC .............. G06F 12/1466; G06F 13/1642; G06F 13/1668; G06F 13/1673; G06F 13/4022; G06F 13/4221; G06F 2213/0026; G06N 2/00
See application file for complete search history.

(56) References Cited

U.S. PATENT DOCUMENTS

| | | | |
|---|---|---|---|
| 2015/0169452 A1* | 6/2015 | Persson | G06F 12/0808 711/135 |
| 2016/0299860 A1* | 10/2016 | Harriman | G06F 13/4282 |
| 2016/0381176 A1* | 12/2016 | Cherubini | G06N 7/01 709/219 |
| 2020/0192798 A1 | 6/2020 | Natu | |
| 2020/0341930 A1* | 10/2020 | Cannata | G06F 9/5077 |
| 2021/0011755 A1 | 1/2021 | Shah | |
| 2021/0075633 A1* | 3/2021 | Sen | H04L 45/74 |
| 2021/0117244 A1* | 4/2021 | Herdrich | G06F 9/5027 |
| 2021/0132999 A1 | 5/2021 | Haywood et al. | |
| 2021/0240655 A1 | 8/2021 | Das Sharma | |
| 2021/0311646 A1 | 10/2021 | Malladi et al. | |
| 2021/0311739 A1 | 10/2021 | Malladi et al. | |
| 2021/0318976 A1* | 10/2021 | Zhang | G06F 13/4282 |
| 2021/0320866 A1 | 10/2021 | Le et al. | |
| 2021/0382838 A1 | 12/2021 | Mittal et al. | |
| 2022/0124038 A1 | 4/2022 | Leguay et al. | |
| 2022/0147476 A1* | 5/2022 | Nam | G06F 3/0604 |
| 2022/0164288 A1 | 5/2022 | Ramagiri et al. | |
| 2022/0350767 A1* | 11/2022 | McGraw | G06F 13/4282 |
| 2022/0398207 A1 | 12/2022 | Norrie et al. | |
| 2022/0405212 A1 | 12/2022 | Kakaiya et al. | |
| 2023/0012822 A1 | 1/2023 | Shah et al. | |
| 2023/0017583 A1 | 1/2023 | Shah et al. | |
| 2023/0017643 A1 | 1/2023 | Shah et al. | |
| 2023/0409302 A1 | 12/2023 | Kodama et al. | |

OTHER PUBLICATIONS

Amir Roozbeh, "Realizing Next-Generation Data Centers via Software-Defined "Hardware" Infrastructures and Resource Disaggregation", Doctoral Thesis KTH Royal Institute of Technology, 227 pages.

Davide Giri et al, "NoC-Based Support of Heterogeneous Cache-Coherence Models for Accelerators", 2018 Twelfth IEEE/ACM International Symposium on Networks-on-Chip (NOCS), IEEE Oct. 4, 2018, pp. 1-8, Section III and figure 3.

Int'l Application Serial No. PCT/US22/73233, ISR/WO dated Oct. 14, 229 pgs.

Kshitij Bhardwaj et al, "Determining Optimal Coherence Interface for Many-Accelerator SoC's Using Bayesian Optimization", IEEE Computer Architecture Letters, IEEE Sep. 16, 2019, pp. 119-123 Section 3.1; and figure 2.

Kshitij Bhardwaj, et al., "A Comprehensive Methodology to Determine Optimal Coherence Interfaces for Many-Accelerator SoC's", ISLPED '20 Proceedings of the ACM/IEEE International Symposium on Low Power Electronics and Design Aug. 10, 2020, pp. 1-6; Section 5 and figure 2.

Prateek Shantharama, et al., "Hardware Accelerated Platforms and Infrastructures for Network Functions: A Survey of Enabling Technologies and Research Studies".IEEE Jul. 9, 2020, Digital Object Identifier 10.1109/ACCESS.2017. DOI.

Yakun Sophia Shao, et al. "Co-Designing Accelerators and SoC Interfaces using gem5-Aladdin", 2016 49th Annual IEEE/ACM International Symposium on Microarchitecture (MICRO). IFEE, Oct. 15, 2016, pp. 1-12, pp. 3-5 and figure 3.

Zuckerman, et al. "Cohmeleon: Learning-Based Orchestration ofAccelerator Coherence in Heterogeneous SoCs", Columbia University, New York, New York, arXiv:2109.06382v1 [cs.AR] Sep. 14, 2021, 14 pages.

\* cited by examiner

| Read Packet 2000A | | | | | | | |
|---|---|---|---|---|---|---|---|
| 2002 | 2004 | 2006 | 2008 | 2010 | 2012 | 2014 | 2016 |
| 8 bit | 6 bit | 6 bit | 2 bit | 2 bit | 8 bit | 36 bit | 4 bit |

| Read Response Packet 2000B | | | | | | | |
|---|---|---|---|---|---|---|---|
| 2002 | 2004 | 2006 | 2008 | 2010 | 2012 | 2018 | 2016 |
| 8 bit | 6 bit | 6 bit | 2 bit | 2 bit | 8 bit | 64+ bit | 4 bit |

| Write Packet 2000C | | | | | | | |
|---|---|---|---|---|---|---|---|
| 2002 | 2004 | 2006 | 2008 | 2010 | 2012 | 2020 | 2016 |
| 8 bit | 6 bit | 6 bit | 2 bit | 2 bit | 8 bit | 64+ bit | 4 bit |

| Write Acknowledgement Packet 2000D | | | | | | | |
|---|---|---|---|---|---|---|---|
| 2002 | 2004 | 2006 | 2008 | 2010 | 2012 | 2014 | 2016 |
| 8 bit | 6 bit | 6 bit | 2 bit | 2 bit | 8 bit | 36 bit | 4 bit |

COMPOSABLE INFRASTRUCTURE ENABLED BY HETEROGENEOUS ARCHITECTURE, DELIVERED BY CXL BASED CACHED SWITCH SOC

CROSS-REFERENCE TO RELATED APPLICATION

This patent document claims the benefit and priority of U.S. Provisional Patent Application No. 63/223,045 to Shah et al., filed on Jul. 18, 2021, and entitled "Disaggregated servers and virtual resource appliance to compose an application server by allocating and deallocating the components from the pool of volatile memory, persistent memory, solid state drives, input/output devices, artificial intelligence accelerators, graphics processing units, FPGAs and domain specific accelerator components via CXL connected to cache coherent switch SoC and composable management software," which is hereby incorporated by reference in its entirety for all purposes.

BACKGROUND

As machine learning and other processes become common, datasets continue to grow in size. As the size of datasets increase, the datasets become impractical to store and, thus, processing on the datasets must be efficiently performed to extract useful insight from such datasets.

SUMMARY

Described are methods and systems utilizing cache coherent switch on chip. In a certain embodiment, a cache coherent switch on chip may be disclosed. The cache coherent switch on chip may include a plurality of ports, each port configured to communicatively couple to an associated component and configured to support a Compute Express Link (CXL) protocol, switched fabric circuitry, communicatively coupled to the plurality of ports and including switched fabric circuitry configured in a mesh network comprising a plurality of nodes, and a microprocessor, communicatively coupled to the switched fabric circuitry and including a fabric manager, configured to allocate and/or deallocate resources to one or more of the plurality of ports.

In another embodiment, a system may be disclosed. The system may include a first server device including a first memory device and a first cache coherent switch on chip, communicatively coupled to the first memory device. The first cache coherent switch on chip may include a plurality of ports, each port configured to communicatively couple to an associated component and configured to support a Compute Express Link (CXL) protocol, switched fabric circuitry, communicatively coupled to the plurality of ports and including switched fabric circuitry configured in a mesh network comprising a plurality of nodes, and a microprocessor, communicatively coupled to the switched fabric circuitry and including a fabric manager, configured to allocate and/or deallocate resources to one or more of the plurality of ports.

Illustrative, non-exclusive examples of inventive features according to the present disclosure are described herein. These and other examples are described further below with reference to figures.

BRIEF DESCRIPTION OF THE DRAWINGS

The disclosure may best be understood by reference to the following description taken in conjunction with the accompanying drawings, which illustrate various embodiments.

DETAILED DESCRIPTION

Figure 1:
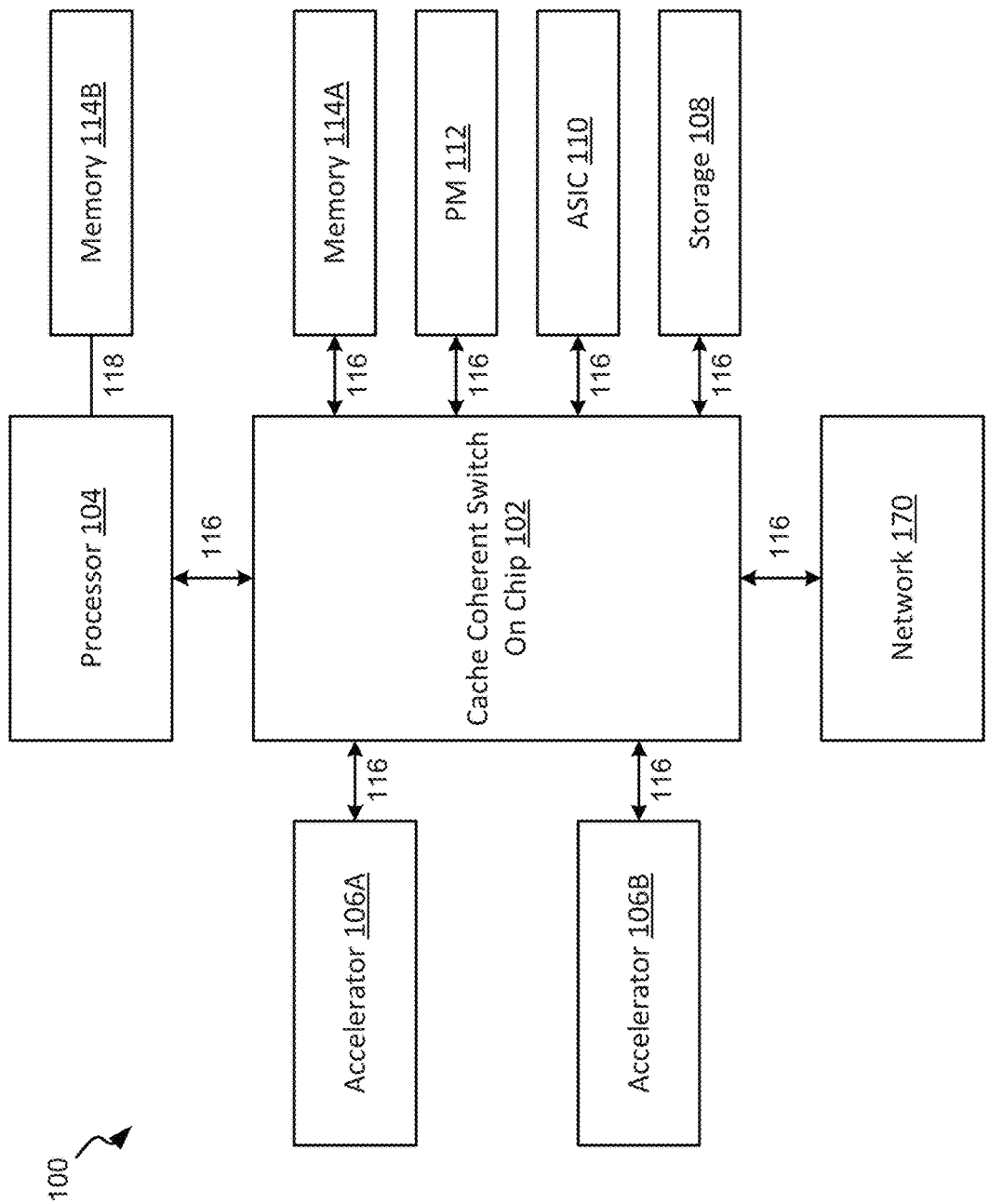
FIG. 1 illustrates a block diagram of an example system, in accordance with some embodiments.

In the following description, specific details are set forth to provide illustrative examples of the systems and techniques described herein. The presented concepts may be practiced without some, or all, of these specific details. In other instances, well known process operations have not been described in detail to avoid unnecessarily obscuring the described concepts. While some concepts will be described with the specific examples, it will be understood that these examples are not intended to be limiting.

For the purposes of this disclosure, certain Figures may include a plurality of similar components. The plurality of such components may be indicated with A, B, C, D, E, F, G, H, . . . N, and/or such indicators to distinguish the individual such components within the Figures. In certain instances, references may be provided to such components without reference to the letter indicators. It is appreciated that, in such instances, disclosure may apply to all such similar components.

Components described herein are referred to with a three digit ordinal indicator number. In certain instances of this disclosure, certain components may be described herein within a plurality of Figures. In such instances, similar components appearing in a plurality of Figures may include the same final two digits of the three digit ordinal indicator number (e.g., X02).

Some embodiments of the disclosed systems, apparatus, methods and computer program products are configured for implementing cache coherent switch on chip. As described in further detail below, such a system may be implemented utilizing the Compute Express Link (CXL) interconnect open standard. Such a CXL based cache coherent switch on chip allows for low latency paths for memory access and coherent caching between devices.

Utilizing CXL, the currently disclosed cache coherent switch on chip allows for connection of a variety of components connected through a high speed low latency interface. The currently disclosed cache coherent switch on chip allows for multi-host access and the sharing of resources. The cache coherent switch on chip allows for greater utilization of resources, creation of composable virtual servers aligned with workloads, higher efficiency and performance of systems, and flexibility for architecture modifications of systems. The features of the cache coherent switch on chip allows for more efficient utilization of resources and power consumption while providing increased system level performance.

The disclosed cache coherent switch on chip allows for component disaggregation and server composability through system resource sharing without requiring a processor to control such resource sharing and, thus, the processor becomes a bottleneck in data centric architectures. As such, system resources may be more fully utilized and resource sharing may optimize component usage within a system, enabling more workloads to be executed. The cache coherent switch on chip also decreases the burden on the system processor, as the system processor is no longer required to handle data and memory transfers and other such tasks.

Furthermore, the disclosed cache coherent switch on chip allows for cache coherency between various different components. Thus, for example, memories, accelerators, and/or other components within the disclosed systems may each maintain caches, and the systems and techniques described herein allow for cache coherency between the different components of the system with minimal latency.

As the size of datasets and the speeds required to process them grow, the value of effective caching and access to such caches becomes ever more valuable. In various embodiments, the systems and techniques may provide for a switch on chip for the caching layer of memory. Thus, cached data, as well as other transient data, may be shared between various devices of a system without requiring CPU involvement. The sharing of cached data or another such transient data may provide for much faster access to such cached data and significantly increase the amount of cached data that may be effectively stored within a system. Accordingly, the systems and techniques provide for switching and sharing of cached data, allowing for data to be accessed at a much faster speed without CPU involvement and for greater optimization of storage of such cached data. Due to CPU involvement no longer being required, a much greater amount of cached data may be shared between various memories, accelerators, graphics cards, and/or other devices including application processes that are running on that CPU as well, increasing the overall performance of those applications.

In various embodiments, a cache hierarchy may be determined and/or utilized by one or more cache coherent switch on chip caches, indicating which caches are prioritized for refreshing and/or reading/writing. In certain embodiments, such caches may be configured to fetch, read, and/or write data according to such hierarchy. Packet flow of data between various components, as well as for caching, may thus be optimized.

FIG. 1 illustrates a block diagram of an example system, in accordance with some embodiments. FIG. 1 illustrates system 100 that includes cache coherent switch on chip 102, processor 104, network 170, accelerators 106, storage 108, application specific integrated circuit (ASIC) 110, persistent memory (PM) 112, and memory module 114. Various components of system 100 may be communicatively and/or electrically coupled with a CXL interface 116, which may be a port. Accordingly, communicative couplings indicated by an interface such as a CXL interface (and/or a PCI or other such interface, as described herein) may each include a corresponding port to establish a signal connection between the two components. Such connections may be indicated by a line with arrows on both ends in the Figures provided herein. Though reference may be made herein to such interfaces, it is appreciated that such references to interfaces may also include the corresponding port of the components (e.g., the ports of the corresponding cache coherent switch on chip). Additionally, other components of system 100 may be communicatively and/or electrically coupled with other interfaces 118, such as Peripheral Component Interconnect (PCI) and/or other such interfaces. Other such interfaces may be indicated by a line without arrows in the Figures provided herein.

Processor 104 may be any type of processor, such as a central processing unit (CPU) and/or another type of processing circuitry such as a single core or multi-core processor. Processor 104 may be a main processor of an electronic device. For the purposes of this disclosure, "processor," "CPU," "microprocessor," and other such reference to processing circuitry may be interchangeable. Thus, reference to one such component may include reference to other such processing circuitry. In various embodiments, an electronic device or system may include one or a plurality of processors 104. Each processor may include associated components, such as memory 114B. Memory 114B may, for example, be a memory module, such as a dual in-line memory module, and may provide memory for processor 104.

Cache coherent switch on chip 102 may be configured to allow for sharing of resources between various components of system 100, as described herein. Such components may include, for example, accelerators 106A and 106B, storage 108 (e.g., smart storage such as harddrives or memories such as solid state drives), ASIC 110, PM 112, and memory 114A. Accelerators 106A and 106B may be hardware or software configured to accelerate certain types of workloads and are configured to more efficiently perform such specific workloads. Storage 108 may be harddrives and/or other storage devices. ASIC 110 may be, for example, artificial intelligence ASICs and/or other such ASICs configured to perform specific tasks. PM 112 may be non-volatile low latency memory with densities that are greater than or equal to DRAM, but may have latencies that are greater than DRAM. Memory 114A may be, similar to memory 114B, a memory module including random access memory (RAM) and/or another such memory.

In various embodiments, cache coherent switch on chip 102 may be communicatively coupled to one or more such components of system 100 via CXL interface 116. Cache coherent switch on chip 102 may be configured to allow for sharing of resources between the various such components. In certain embodiments, cache coherent switch on chip 102 may include its own resources, such as its own RAM module, as well as other such resources that are described herein. Such resources may also be shared between the various components. Cache coherent switch on chip 102 may utilize CXL interface 116 to provide low latency paths for memory access and coherent caching (e.g., between processors and/or devices to share memory, memory resources, such as accelerators, and memory expanders). CXL interface 116 may include a plurality of protocols, including protocols for input/output devices (TO), for cache interactions between a host and an associated device, and for memory access to an associated device with a host. For the purposes of this disclosure, reference to a CXL interface or protocol described herein may include any one or more of such protocols. Cache coherent switch on chip 102 may utilize such protocols to provide for resource sharing between a plurality of devices by acting as a switch between the devices.

Various caching techniques may be utilized for caching within cache coherent switch on chip 102. For example, multi-level caching or buffering may be used. Multi-level caching or buffering may be performed by one or more memory banks on cache coherent switch on chip 102 or on attached memory (e.g., memory that is directly communicatively coupled to the cache coherent switch on chip or communicatively coupled via CXL interface).

In certain embodiments, the caching or buffering may include a plurality of levels. Such different levels of caching or buffering may indicate caches or buffers that are available to different levels of software and/or hardware. The levels may, thus, correspond to caches or buffers that are communicatively coupled to system 100 and/or cache coherent switch on chip 102 in different manners and/or configured to service different portions of system 100 and/or cache coherent switch on chip 102. The levels of cache buffering may correspond to importance of data and/or frequency of access. Thus, data that is more frequently called may be buffered at the first level, while data that is less frequently called may be buffered at higher levels. In various embodiments, a request for cache/buffer data that results in a miss (e.g., data not provided) at a lower level may then accordingly be forwarded to a higher level. In various embodiments, memory used for caches/buffers may be DDR, PM, solid state drive (SSD), or another such type of memory.

In certain embodiments, a first level cache buffer may be present on cache coherent switch on chip 102 and/or on attached memory (either directly communicatively coupled memory and/or communicatively coupled via CXL interface). A second level cache buffer may be attached to a switch port (DDR) or accessible through the switch fabric. For the second level cache buffer, partial tag RAM may be located on chip (e.g., the processor) and full tag RAM may be located in memory of the cache device. A third level cache buffer may be attached to a switch port on the same chip or to a network port on the chip, communicatively coupled to a second switch chip. In further embodiments, additional levels of cache buffering (e.g., on ports of the same chip and/or on different chips communicatively coupled through a network/fabric) may be utilized. One or more of a plurality of ports may also be utilized for caching/buffering techniques.

In various embodiments, caching/buffering may be performed with internal cache memory (e.g., internal to the chip) and/or via communicatively coupled memory (e.g., communicatively coupled to other memories via CXL interface). In certain embodiments, internal cache memory may provide for low latency while communicatively coupled external memory may provide for higher memory density. External memory may be accessed through the switch fabric to the CXL interface attached memory. Accessing through the switch fabric may allow for flexibility over which ports may access (request) the external memory and which ports are coupled to the CXL interface attached memory.

In certain embodiments, distributed internal caching may be performed via switch fabric. Such a technique may include utilizing a requesting port to decode whether certain traffic is cacheable. If the traffic is cacheable, on chip memory may be utilized for the first level of caching. The requesting port may include tag RAM that is applicable to all on chip memory on the first level of caching. Such tag RAM may allow for a single lookup request for all of the chip memory on the first level of caching. A hit for a tag RAM lookup request may then indicate the location of the cached/buffered data, whether that hit is from a local or remote port and/or memory. In certain embodiments, caching/buffering within local memory may allow for low latency advantages. In various embodiments, the switch fabric may provide such requests to all local and/or remote memory.

Typically, all components of a system are controlled via a processor. Thus, component-to-component traffic is controlled by the processor. In such a configuration, the processor, due to limited resources, becomes a bottleneck in component-to-component traffic, limiting the speed of component-to-component traffic. The techniques and systems described, such component-to-component traffic is controlled via cache coherent switch on chip 102, with CXL interface 116, generally bypassing processor 104. As CXL interface 116 allows for an extremely low latency interface between components, processor 104 is no longer a bottleneck and sharing of resources may be performed more quickly and efficiently.

Figure 2:
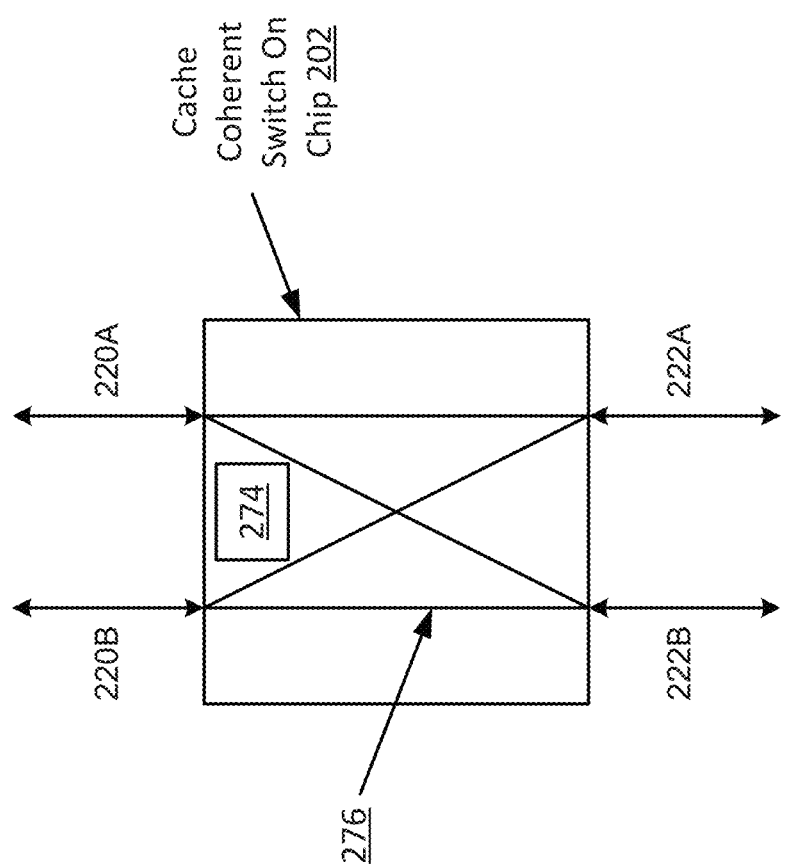
FIG. 2 illustrates a block diagram of an example cache coherent switch on chip, in accordance with some embodiments.

FIG. 2 illustrates a block diagram of an example cache coherent switch on chip, in accordance with some embodiments. FIG. 2 illustrates cache coherent switch on chip 202. Cache coherent switch on chip 202 includes one or more upstream ports 220 and one or more downstream ports 222. Each of upstream ports 220 and downstream ports 222 may be configured to support PCI or CXL protocol. As such, upstream ports 220 and downstream ports 222 may be ports configured to support any combination of PCI and/or CXL protocols.

In certain embodiments, one or more upstream ports 220 may be configured to support CXL protocols while one or more downstream ports 222 may be configured to support PCI and CXL protocols. In another embodiment, one or more upstream ports 220 may be configured to support PCI protocols while one or more downstream ports 222 may be configured to support CXL protocols. In a further embodiment, one or more upstream ports 220 may be configured to support PCI protocols while one or more downstream ports 222 may be configured to support PCI protocols. In yet another embodiment, one or more upstream ports 220 may be configured to support CXL protocols while one or more downstream ports 222 may be configured to support CXL protocols.

Cache coherent switch on chip 202 may include switched fabric circuitry 276 that includes a plurality of nodes and may interconnect a plurality of ports. Switched fabric circuitry 276 may be configured to receive input and/or provide output to the various ports. Accordingly, switched fabric circuitry 276 may be coupled to downstream ports 220, upstream ports 222, and/or other ports and/or portions of cache coherent switch on chip 202. Switched fabric circuitry 276 may be circuitry configured in a switched fabric manner (e.g., in a mesh network), to allow for inputs and outputs to be interconnected and signals accordingly communicated.

Cache coherent switch on chip 202 may include processing core 274. Processing core 274 receives electrical signals from ports of cache coherent switch on chip 202 and transforms and/or outputs associated electrical signals to other ports of cache coherent switch on chip 202. Processing core 274 may be configured to transform signals from a first protocol to a second protocol, and/or may be configured to determine the appropriate port to output signals toward.

Figure 3:
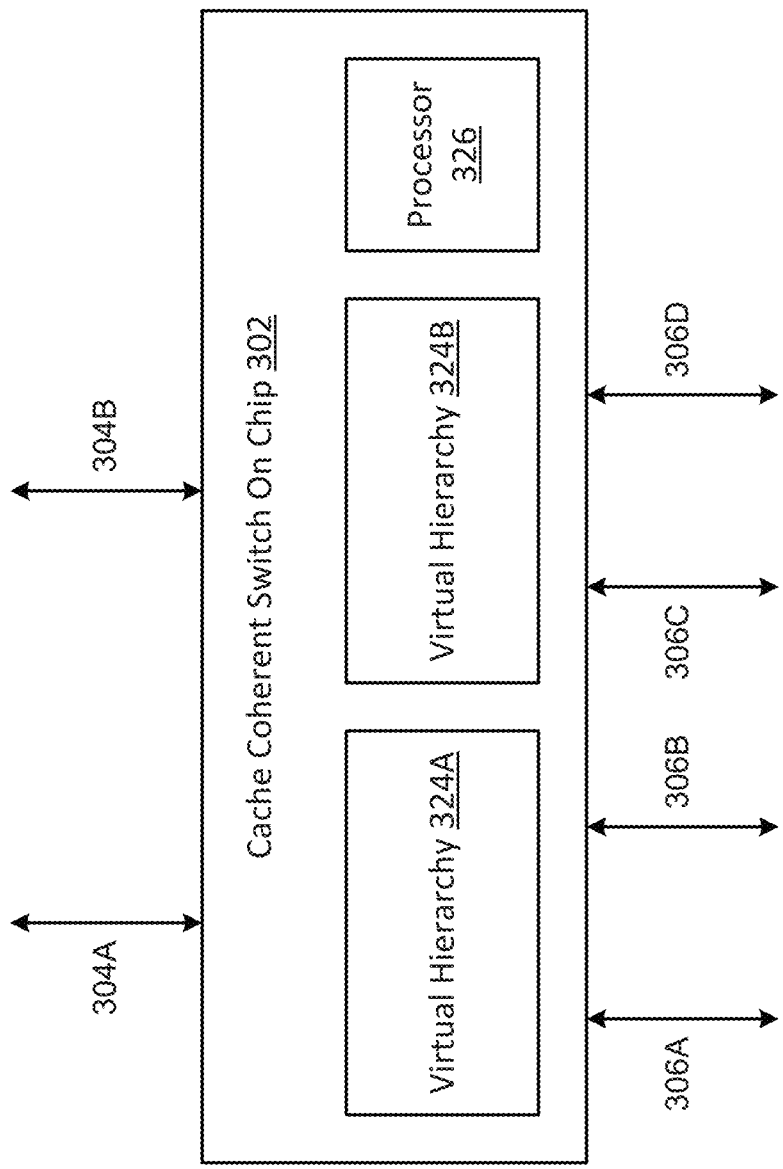
FIG. 3 illustrates a block diagram of another example cache coherent switch on chip, in accordance with some embodiments.

FIG. 3 illustrates a block diagram of another example cache coherent switch on chip, in accordance with some embodiments. FIG. 3 illustrates cache coherent switch on chip 302 that includes upstream ports 304 and downstream ports 306. Furthermore, cache coherent switch on chip 302 may include a plurality of virtual hierarchies 324 (e.g., virtual hierarchies 324A and 324B, as well as possibly additional virtual hierarchies) and processor 326. Each virtual hierarchy 324 may include a combination of PCI and CXL protocols. Any combination of devices described herein may be coupled to upstream ports 304 and/or downstream ports 306, including memory devices, accelerators, and/or other such devices.

In various embodiments, a cache hierarchy may be determined and/or utilized by cache coherent switch on chip 302. The cache hierarchy may be, for example, a version of virtual hierarchy 324 and may indicate the priority for the caches of components coupled to cache coherent switch on chip 302. The cache hierarchy may indicate a priority for refreshing and/or reading/writing the caches of the various components. Such a cache hierarchy may be determined by cache coherent switch on chip 302 based on machine learning according to the techniques described herein and/or may be a preset hierarchy (e.g., a preset hierarchy of which caches of certain components are given priority and/or which components are given priority in utilization of the caches). In certain embodiments, such caches may be configured to fetch, read, and/or write data according to such hierarchy (e.g., higher priority components may be given priority for fetching, reading, and/or writing data to caches, according to the cache hierarchy).

In certain embodiments, one or more of upstream ports 304 and/or downstream ports 306 may include a bridge (e.g., a PCI-to-PCI bridge (PPB)) for coupling the ports to devices. Furthermore, cache coherent switch on chip 302 may include one or more virtual bridges (e.g., vPPB) for binding to one or more components coupled to cache coherent switch on chip 302. In various embodiments, such bridges may additionally include bridges such as SR2MR (Single Root to Multiple Root), SLD2MLD (Single Logical Device to Multi Logical Device), and/or other such legacy bridges to provide for communications with legacy devices. In various embodiments, one, some, or all of the nodes and/or mesh network of switched fabric circuitry 276 may be composed with PPB and vPPB.

In certain embodiments, SR2MR bridges may be configured to allow a single root PCIe device to be exposed to multiple host ports. For SR2MR bridges, downstream ports may implement one or a plurality of virtual point-to-point (P2P) bridges. In certain embodiments, one virtual P2P bridge may be utilized for each virtual hierarchy. The SR2MR bridges may be a part of a switch on chip or may be a separate chip communicatively coupled to the switch on chip.

In certain embodiments, SLD2MLD bridges may be configured to allow a CXL standard single logical device to be seen as a multi logical device by the switch domain. Downstream ports implement address translation and enforces the isolation normally performed by multi logical devices. The SLD2MLD bridges may be a part of the switch on chip or may be a part of a separate chip communicatively coupled to the switch on chip.

Figure 4:
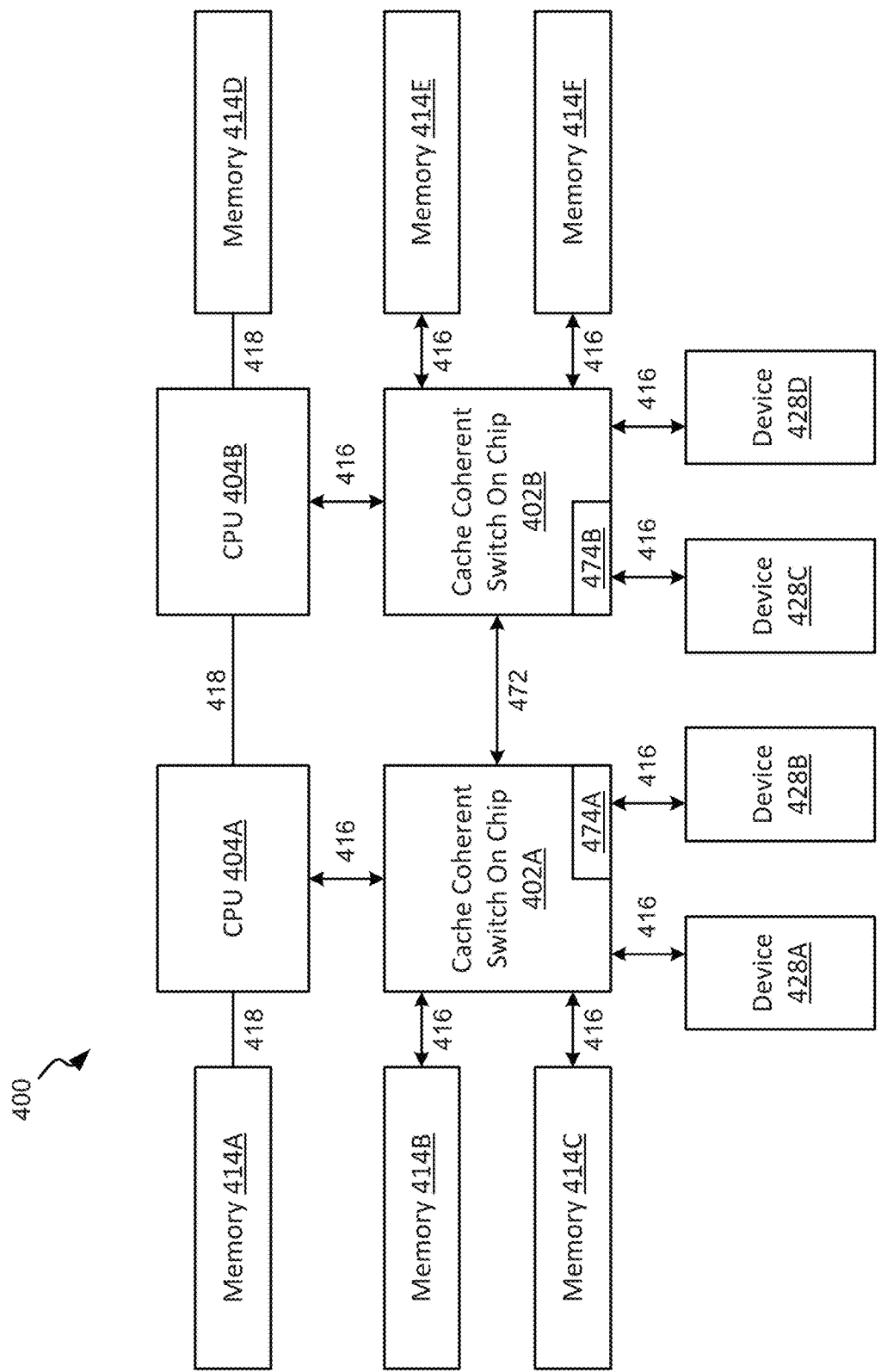
FIGS. 4-10 illustrate block diagrams of example systems, in accordance with some embodiments.

FIGS. 4-10 illustrate block diagrams of example systems, in accordance with some embodiments. FIG. 4 illustrates system 400 that includes a plurality of cache coherent switch on chips 402, CPUs 404, a plurality of memories 414, and a plurality of devices 428. While the embodiment shown in FIG. 4 illustrates a configuration where cache coherent switch on chip 402A is communicatively coupled (via CXL interface 416) to CPU 404A and cache coherent switch on chip 402B is communicatively coupled to CPU 404B, in various other embodiments, a single CPU may be coupled to both cache coherent switch on chip 402A and 402B. In various embodiments, CPU 404A and 404B may be communicatively coupled with interface 418. One or both of CPUs 404A and 404B may be in an active state or one of CPUs 404A and 404B may be demoted to a passive state. When in the passive state, the passive CPU may not control downstream devices 428 and, thus, control of such devices 428 may be exclusively by the active CPU.

Cache coherent switch on chips 402A and 402B may be communicatively coupled via expansion port 472. In certain embodiments, cache coherent switch on chips 402 may include processing cores 474. Expansion port 472 may be a port on cache coherent switch on chips 402 to allow for expansion of processing power of cache coherent switch on chips 402 by, for example, allowing for interconnection of processing cores 474 (e.g., processing cores 474A and 474B). Expansion port 472 thus allows for increase in processing power and, in certain embodiments, expansion in the amount of component resources that may be shared. Accordingly, for example, memories 414B, 414C, 414E, and 414F as well as devices 428A to 428D may all be pooled resources for system 400. Memories 414 may be any type of appropriate memory described herein. One or more memories 414 may form a memory bank for portions of system 400, such as for one or more cache coherent switch on chips 402. Devices 428 may be any sort of device of a computing system, such as PCIe/CXL storage devices, graphics cards, ASICs, I/O devices, and/or other such devices. Furthermore, communicatively and/or electrically coupling together cache coherent switch on chips 402A and 402B may provide for greater system redundancy, increasing reliability.

Though the embodiment of FIG. 4 illustrates cache coherent switch on chips 402A and 402B being electrically and/or communicatively coupled between expansion port 472, other embodiments may couple various cache coherent switch on chips with other techniques, such as over a local area network (LAN), over the internet, and/or over another such network.

In certain embodiments, each of cache coherent switch on chip 402A and 402B may include their own virtual hierarchies. When coupled as in FIG. 4, the virtual hierarchies of one or both of cache coherent switch on chips 402A and 402B may be utilized for switching operations.

Figure 5:
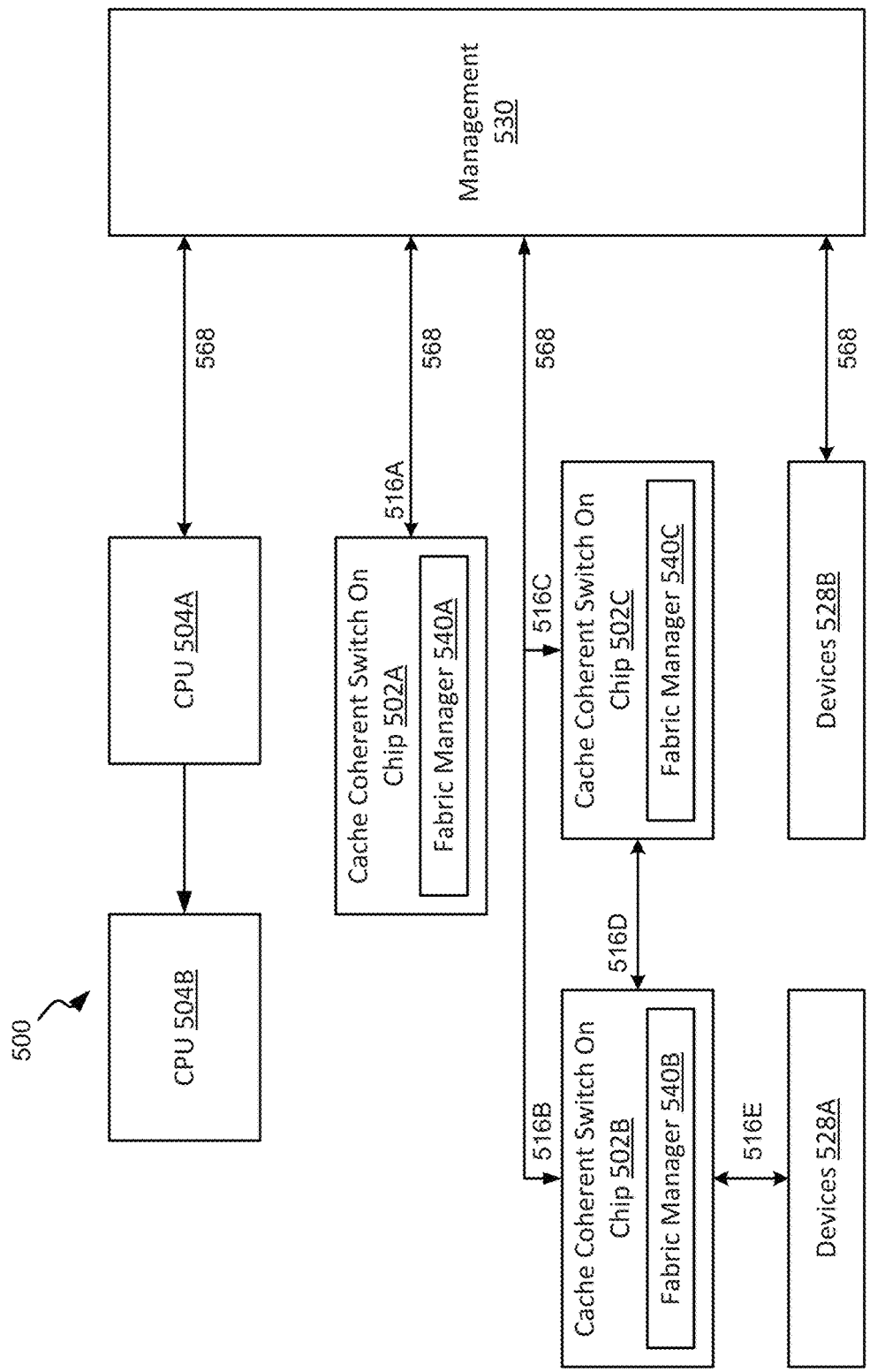

FIG. 5 illustrates system 500 that includes cache coherent switch on chips 502A to 502C, CPUs 504A and 504B, management 530, and devices 528. Each of cache coherent switch on chips 502A, 502B, and 502C may include their own individual virtual hierarchies. In certain embodiments, cache coherent switch on chips 502 may include a fabric manager 540 to manage resources connected to the ports (e.g., ports 516) of cache coherent switch on chips 502. The fabric manager 540 may connect to higher level management software entities (e.g., management 530) via Ethernet 568 (as, for example, Redfish over Ethernet) and/or another network or protocol (e.g., e, such as I2C/I3C transports). Ethernet 568 may further communicatively and/or electrically couple cache coherent switch on chips 502A, 502B, and 502C and CPUs 504 and devices 528.

Fabric manager 540 may be configured to allocate and/or deallocate resources attached to the ports of cache coherent switch on chips 502 to applications running on such ports (e.g., to applications running on ASICs coupled to ports of cache coherent switch on chips 502). Fabric manager 540 may be configured to receive signals (e.g., data) from an upstream port and direct the signal to the appropriate downstream port. Various techniques for receiving and directing such signals (e.g., packet flows) are described herein. Fabric manager 540, as well as other firmware and/or software may further manage hot plug coupling by devices 528 to downstream CXL ports. Fabric manager 540 may also manage the inventory of various devices coupled to the ports of the respective cache coherent switch on chip 502.

Fabric manager 540 may be communicatively coupled to management 530 for top level management of system 500, including management of the various cache coherent switch on chips 502 described herein. Thus, in various embodiments, management 530 may be, for example, a baseboard management controller and/or another management device or server configured to provide management/orchestration. In various embodiments, management 530 may interface with fabric management 540 to provide for management of the various cache coherent switch on chips (e.g., via a specific fabric management API).

Fabric manager 540 may be implemented within firmware of cache coherent switch on chip 502 (e.g., within the firmware of a microprocessor of cache coherent switch on chip 502). Such firmware may include a system fabric manager that implements the logic for operations to be performed by switch hardware and other helper functions for implementing the API and a CXL fabric manager for implementing the front-end fabric manager APIs according to the CXL specifications.

In certain embodiments, a CXL single logical device (SLD), such as device 528A, may be hot-inserted into or hot-removed from cache coherent switch on chip 502B (e.g., via port 516E, which may be a PCI and/or CXL protocol port). When such an SLD is first hot-inserted, it is assigned to fabric manager 540B. Diagnostics may be performed on the newly inserted SLD (e.g., either run as self-diagnostics by device 528A or run via diagnostics software on the processing core of cache coherent switch on chips 502). After the SLD has been determined to be ready, it can be assigned to one of the ports (e.g., port 516E) of cache coherent switch on chip 502B based on policy (e.g., due to a virtual hierarchy) or via a command (e.g., from software within system 500).

The assignment may include binding the corresponding downstream PPBs of a cache coherent switch on chip 502 to one of the vPPBs, virtual hierarchies, and host port of cache coherent switch on chip 502. The managed hot-inserted device 528A is then presented to the host port (e.g., port 516E) after its assignment to the respective virtual hierarchy to allocate device 528A. The host CPU (e.g., the CPU within the respective cache coherent switch on chip 502) may then discover device 528A (e.g., via software), load software for device 528A and begin communicating with device 528A.

Figure 6:
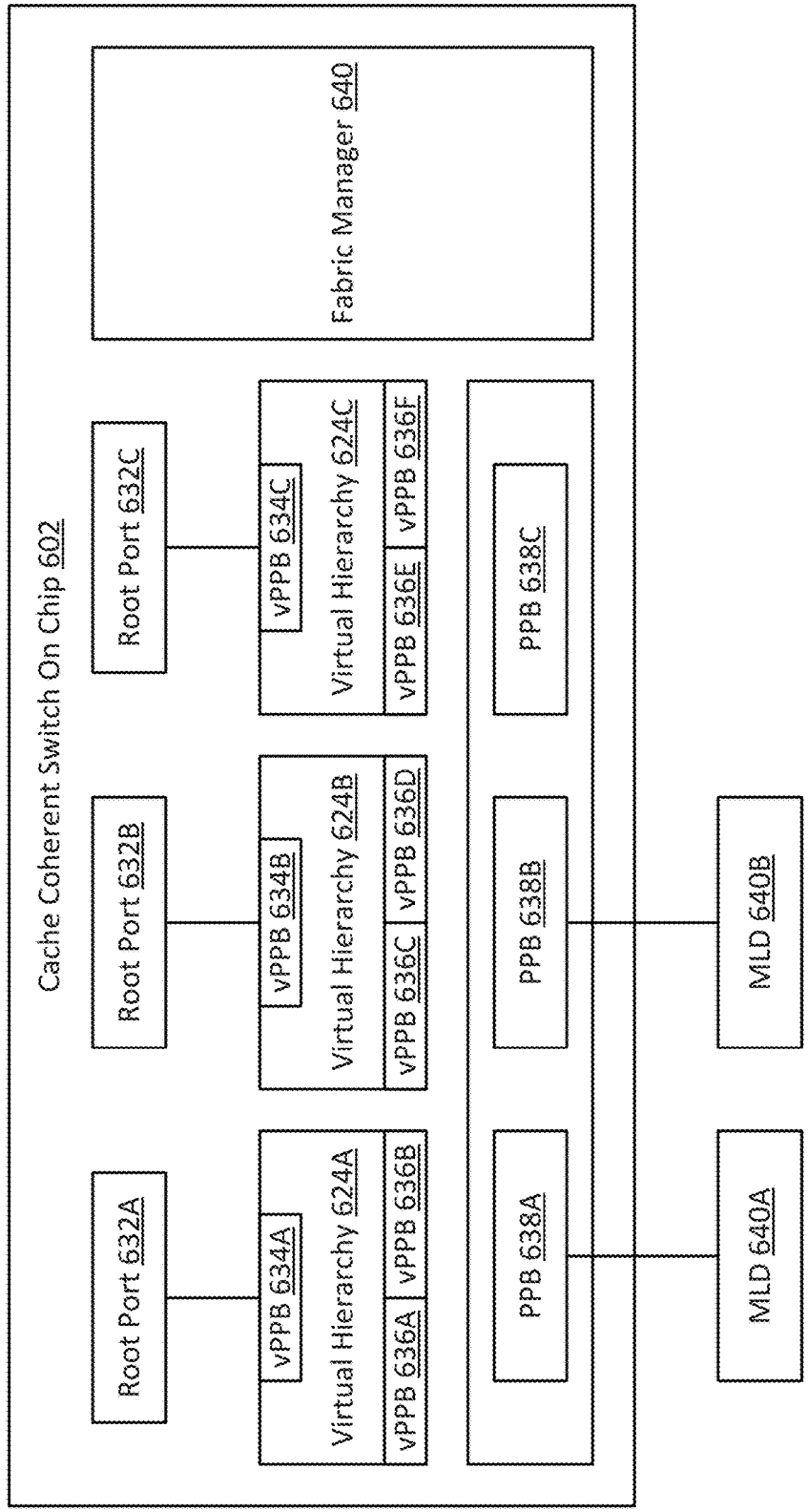

FIG. 6 illustrates system 600. System 600 may illustrate cache coherent switch on chip 602. Cache coherent switch on chip 602 may include a plurality of root ports 632 and a plurality of virtual hierarchies 624. The plurality of root ports 632 may include the ports described herein, as well as, for example, that of internal components within cache coherent switch on chip 602, such as microprocessors/CPUs and/or other components. Each root port 632 may be assigned to downstream CXL protocol resources. Each virtual hierarchy 624 may include a plurality of vPPBs, where certain vPPBs 634 are associated with root ports 632 and other vPBBs 636 are associated with PPBs 638. Various multi-logical devices (MLDs) 640 may be coupled to downstream ports via certain PPBs 638.

Cache coherent switch on chip 602 may include a plurality of root ports 632. Such root ports 632 may include, for example, ports associated with compute cores embedded in cache coherent switch on chip 602 as well as external devices. Root ports 632 may be assigned to downstream CXL resources, including embedded accelerators within system 600. Fabric manager 640 may include a processor (e.g., an ARM processor or another type of processor) and such a processor may be a part of one or more virtual hierarchies 624. Various downstream PPB ports 638 may be communicatively coupled to MLDs 640. The assignment of MLDs 640, as well as other components such as SLDs, memories, accelerators, and other such components, to certain PPBs 638 and vPPBs 636 may be controlled by fabric manager 640. Thus, fabric manager 640 may detect that a component has been coupled to a port of cache coherent switch on chip 602 and accordingly assign the component to the appropriate virtual hierarchy 624 (e.g., based on the detected type of the component). Furthermore, the appropriate PPB 638 and/or the vPPB 636 may be assigned to the component. In certain embodiments, such assignment may be based on the detected type of the component and on virtual hierarchy 624.

Figure 7:
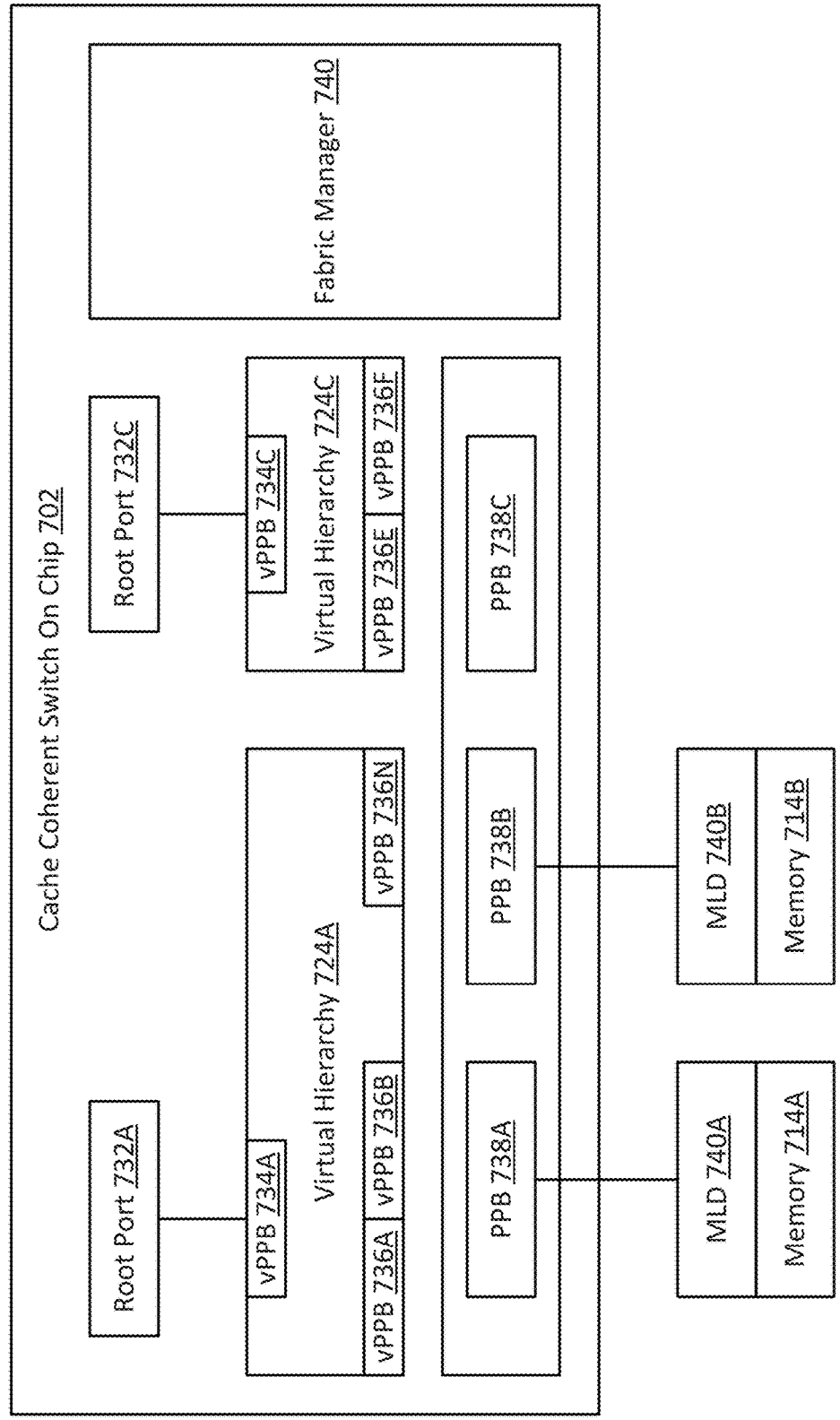

FIG. 7 illustrates system 700 that includes cache coherent switch on chip 702. As shown in FIG. 7, MLDs 740A and 740B are coupled to PPBs 738A and 738B, respectively. MLDs 740A and 740B include memories 714A and 714B, respectively, and are thus utilized as memory expansion. Coupling of memories 714A and 714B to system 700 allows for an increase in the amount of memory of system 700 (e.g., system 700 may be, for example, a single socket server).

In various embodiments, the amount of memory attached to a socket is limited by the number of channels that the socket supports. In certain situations, in a data-centric environment, an entire operating data set may not fit in a server's available memory, resulting in poor performance and increased latency when processing the data. Cache coherent switch on chip 702 addresses this problem by allowing for low-latency memory expansion due to memories 714A and 714B via the ports of cache coherent switch on chip 702, increasing the amount of memory available to a host CPU (beyond what could be connected directly to the CPU). Memories 714 may be DDR4, DDR5, future DDR, DRAM, PM, NVMe, Low-Power Double Data Rate (LPDDR), and/or other such appropriate memory drives which may be expanded via CXL protocol through cache coherent switch on chip 702.

Such an ability of cache coherent switch on chip 702 is particularly beneficial in providing cost and performance advantages for memory intensive applications that would otherwise require a computing device with a large memory footprint or result in poor performance in a less expensive computing device with limited memory.

Figure 8:
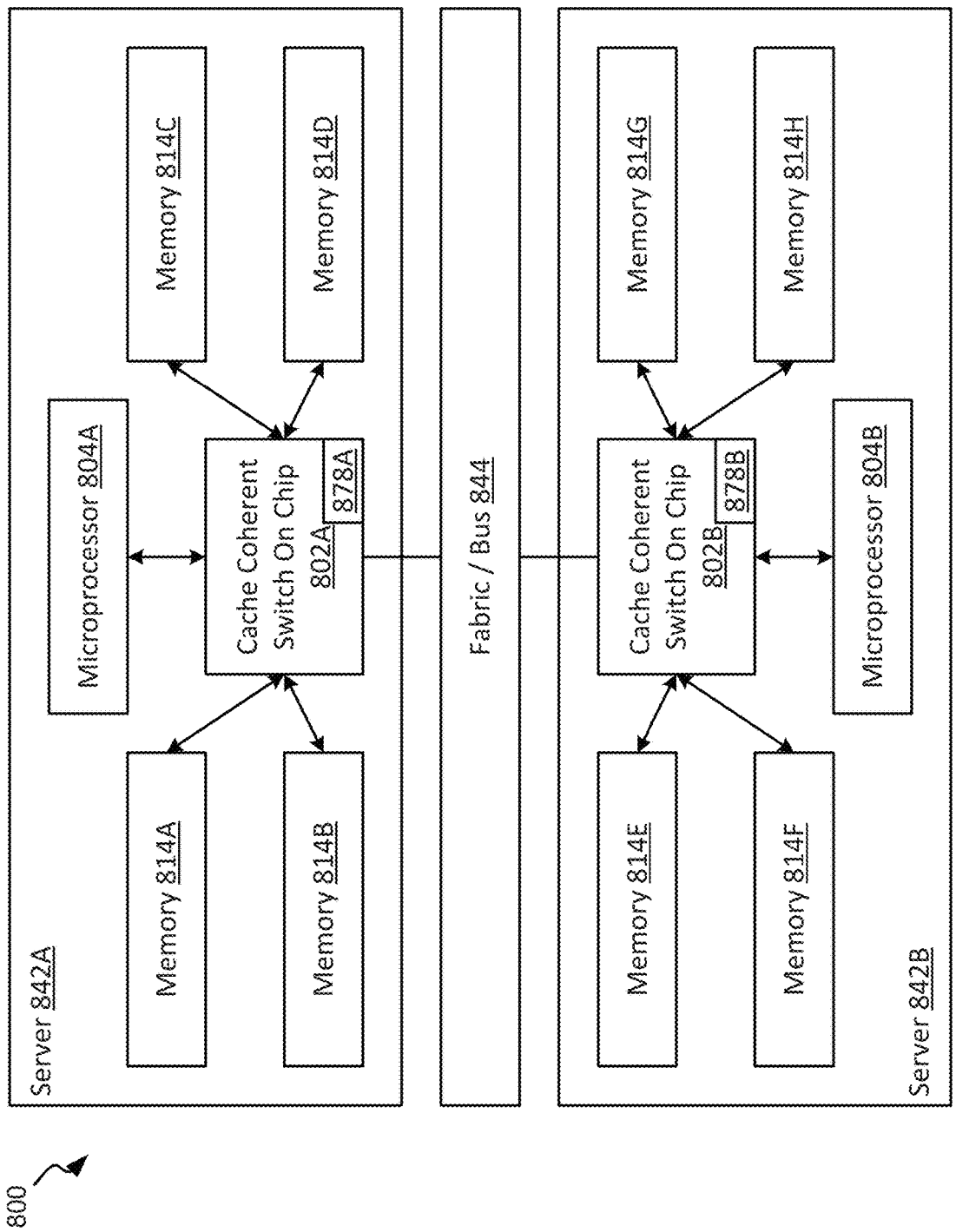

FIG. 8 illustrates system 800 that includes a plurality of servers 842A and 842B. Each server 842 may include its own cache coherent switch on chip 802, a plurality of memories 814 communicatively coupled to each cache coherent switch on chip 802, and a microprocessor 804 communicatively coupled to each cache coherent switch on chip 802. Cache coherent switch on chip 802A and 802B may be communicatively coupled via fabric switch/bus 844. In various embodiments, fabric switch/bus 844 may be, for example, a switch fabric, a bus bar, and/or another such technique for communicating signals between different server devices.

As illustrated in FIG. 8, memories may be pooled between different microprocessors 804. Such memories may include memories 814 communicatively coupled to cache coherent switch on chips 802 and/or memory that is socket connected to various microprocessors 804. Thus, cache coherent switch on chips 802 may allow for pooling of memory and other resources (e.g., AI, ASICs, GPUs, SNICs, NVMe, storage, and/or other such resources) between servers 842 that are communicatively coupled via switch fabric/bus 844. As signals communicated between switch fabric/bus 844 may be similar to that of signals communicated within a single server device, cache coherent switch on chips 802 may allow for sharing of such resources in a similar manner to that described herein. In various embodiments, a plurality (two or more) of servers 842 may, accordingly, pool memory resources such as DRAM, PM, and/or other such memories. Such resources may be shared over fabric switches for memory pooling inside a server, between servers within a server rack, between various servers and racks within a data center, and/or between data centers. In a further embodiment, messages may be passed between components in a manner similar to that of the sharing of resources. Such techniques allow for reduction in the communication of messages between various components, increasing the performance of, for example, AI or ML workloads on processors.

In various embodiments, cache coherent switch on chips 802 may provide compression and/or decompression ability to conserve persistent memory as well as crypto ability to provide added security between transactions into and out of persistent memory.

In certain embodiments, a prefetched buffer scheme may be used at the memory source. Buffering may be utilized for a directly attached memory or for remote memory through a further fabric connection. Accordingly, in various embodiments, cache coherent switch on chips 802 may include memory prefetchers 878. Memory prefetchers 878 may be an intelligent algorithm run by the processing core of the cache coherent switch on chips 802. Memory prefetchers 878 may be an artificial intelligence (AI) or machine learning (ML) prefetcher configured to predict the addresses of future accesses to memories based on past access patterns by the hosts and/or the identity of components and/or applications communicatively coupled to the various ports of portions of system 800 (e.g., couple to ports that are communicatively coupled to cache coherent switch on chip 802A and/or 802B), and prefetch data from such memories for those addresses to store in RAM buffers to reduce the latency of future accesses by the host applications. In certain embodiments, accelerators communicatively coupled to cache coherent switch on chip 802 may also be configured to provide prefetching when pooling resources via cache coherent switch on chips 802 between servers 842A and 842B.

In certain embodiments, disaggregated servers 842 may pool memory and/or other resources across a midplane (e.g., bus 844). Thus, for example, in a chassis or blade server, a large shared pool of memory on memory cards/blades is available to be used by server cards/blades (that could be lightweight servers, aka thin servers, with a minimal amount of their own memory connected to the CPU socket). Such memory pooling may provide cost and/or power consumption advantages by reducing the amount of unused memory and/or other resources in data center servers, as memory/resource pooling allows for greater flexibility and, thus, a lower requirement for fixed resources. Servers may also be more flexibly configured due to the advantages of resource sharing.

In a certain use case, current typical server systems may include 512 gigabyte (GB) or so of volatile memory in cloud service provider infrastructure. A portion of this memory is typically stranded due to lower memory utilization for all the applications. Additionally, certain cloud environments include highly memory intensive applications that require more than 512 GB of memory. Currently, for example, platforms allocate all the servers with 512 GB memory due to simplicity, stranding the memory resources in the majority of the servers in order to have enough capacity for edge use cases. The currently disclosed cache coherent switch on chips addresses this memory stranding problem by allowing for the sharing of CXL protocol persistent memory both inside the server system and to outside servers connected via a network.

Figure 9:
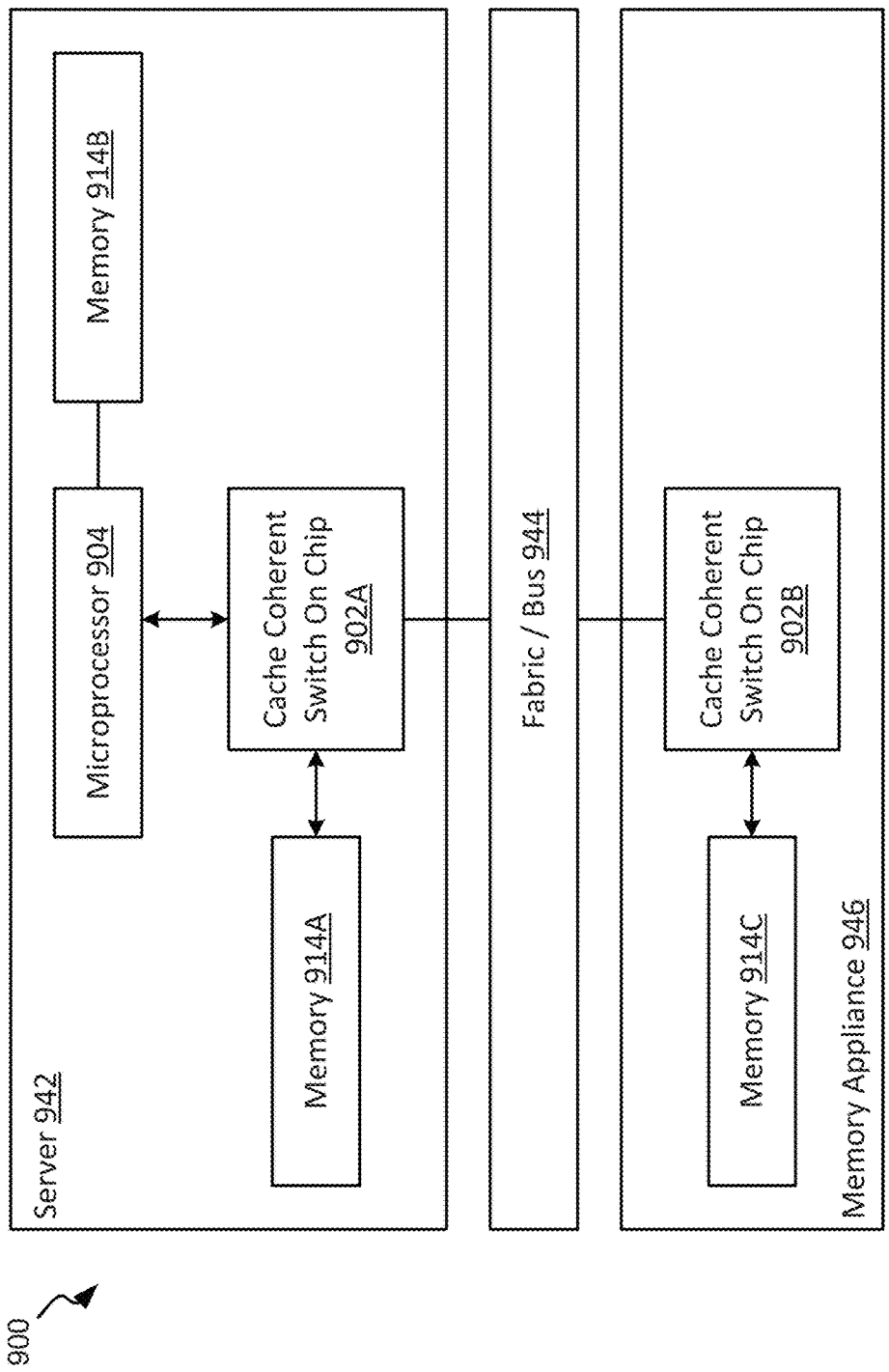

FIG. 9 illustrates system 900 that includes server 942, switch fabric/bus 944, and memory appliance 946. Memory appliance 946 may be a shared or expansion memory for server 942. System 900 allows for memory 914A of cache coherent switch on chip 902A to be declared as a cache buffer for persistent memory ports (e.g., ports coupled to switch fabric/bus 944 and, thus, memory 914C of memory appliance 946). Utilizing memory 914A as a read/write buffer hides the access time of utilizing memory appliance 946 and, thus, memory 914C.

In various embodiments, there may be both write and read flows for memory 914A. In a write flow, microprocessor 904 may indicate that writes on memory 914A are steered to a DRAM buffer port of cache coherent switch on chip 902A. For such writes, cache coherent switch on chip 902A may check to ensure that memory 914C is configured to provide buffer write/read commands to memory 914A, allowing for memory 914A to be used as a buffer for memory 914C. Thus, memory 914C is updated so that the buffer write/read address of memory 914C refers to that of memory 914A. Memory 914A may then be accordingly utilized as a buffer for memory 914C, avoiding the increase in access time of utilizing memory appliance 946.

In certain embodiments, for a read flow, microprocessor 904 may first query the buffer port of memory 914A for the wanted data. If such data is present within the buffer of memory 914A, the data may be provided to microprocessor 904. If memory 914A does not include such data, memory 914C may be queried and the requested data may be provided from memory 914C over switch fabric/bus 944.

In certain embodiments, the cache buffers of memory 914A include AI/ML prefetch algorithms. The algorithm is configured to predict the next set of addresses (expected to be fetched by the applications) and configures a direct memory access (DMA) engine to prefetch those addresses and store the data in read/write buffers, to be ready to be read by the applications. In certain embodiments, cache coherent switch on chip 902A is configured to keep statistics of hit ratios for each line that was prefetched to provide feedback to the algorithm for continuous improvement (e.g., to determine which prefetched data has been utilized).

In certain embodiments, cache coherent switch on chip 902A may provide instructions for operation of the memory prefetcher. Thus, cache coherent switch on chip 902A may be configured to determine data to be prefetched (e.g., based on the AI/ML prefetch algorithm) and provide instructions (via switch fabric/bus 944) to memory 914C to provide such prefetched data to memory 914A (via switch fabric/bus 944) for caching. Memory 914C may accordingly provide such data for buffering by memory 914A.

In certain embodiments, each upstream port of cache coherent switch on chip 902A is configured to determine whether a cache buffer port is assigned for the respective upstream port. If a cache buffer port is assigned, a further determination may be made as to which downstream port is assigned as the cache buffer port. Incoming traffic may then be accordingly provided to the assigned downstream port for cache buffer purposes.

In various embodiments, caching may be performed by memory of the switch on chip and/or memory attached to the ports of the switch on chip. Variously, cache coherent switch on chip 914A may determine whether requested data is within the cache and retrieve such data if it is present within the cache. If the data is not within the cache, a request may be provided to the coupled persistent memory for the data and the data may be accordingly provided. In certain embodiments, write requests may be provided to both the cache and the persistent memory.

Figure 10A:
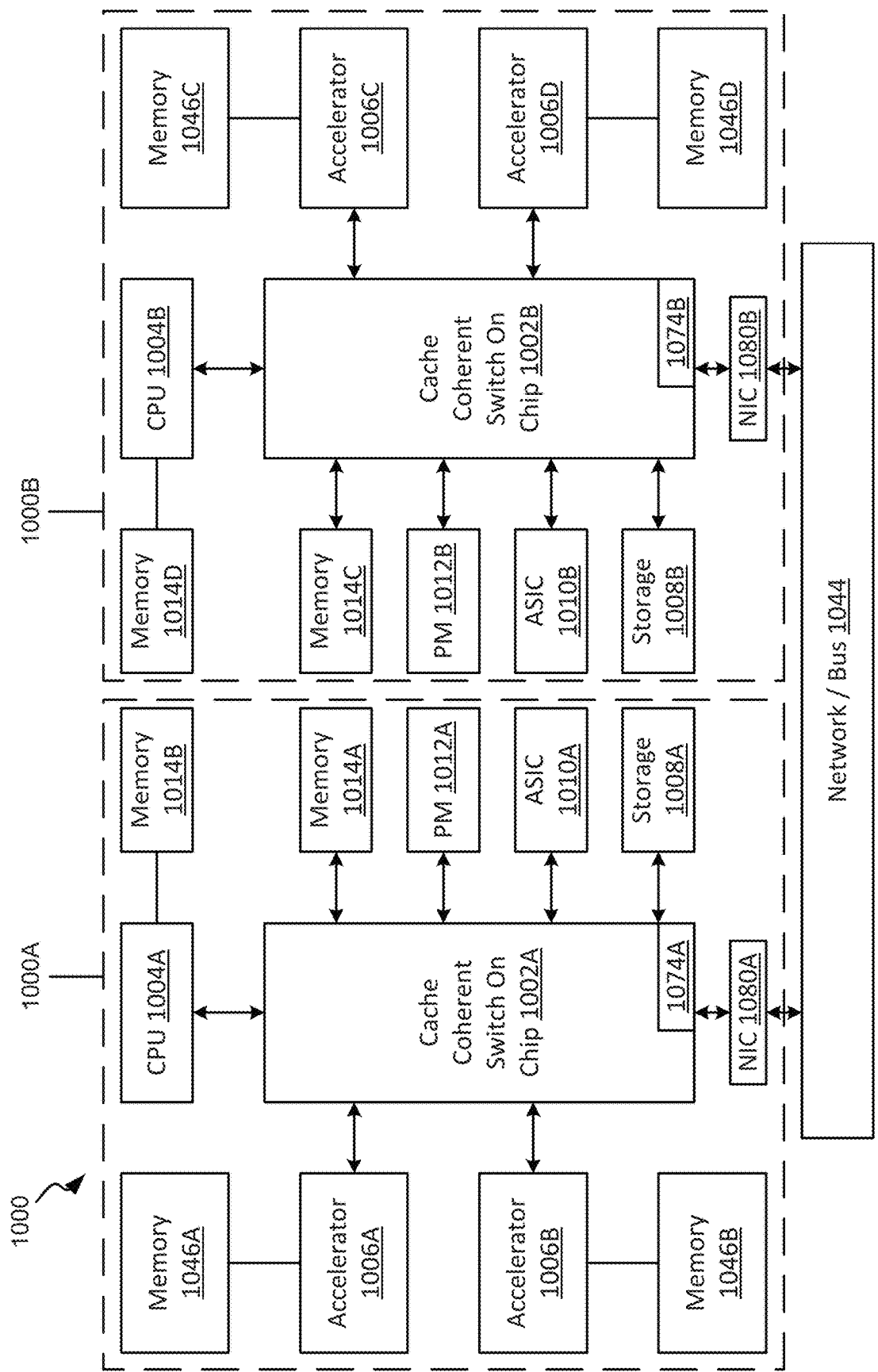

FIG. 10A illustrates system 1000 that includes servers 1000A and 1000B. Each server 1000A/B includes a cache coherent switch on chip 1002, each cache coherent switch on chip 1002 communicatively/electrically coupled to CPU 1004, accelerator 1006, storage 1008, ASIC 1010, PM 1012, memory 1014, and network interface card (NIC) 1080. Each accelerator 1006 may include respective memory 1046, which may include its own cache coherent and non-cache coherent storage. Cache coherent switch on chips 1002A and 1002B may be communicatively coupled via network/bus 1044. FIG. 10A may illustrate a configuration where a cache coherent switch on chip of a first server may bridge over Ethernet to another cache coherent switch on chip of a second server.

In various embodiments, cache coherent switch on chips 1002A and 1002B may be communicatively coupled via an Ethernet connection (e.g., via network 1044). As such, cache coherent switch on chips 1002 may communicate via CXL protocol through Ethernet to allow for resource pooling and/or sharing (e.g., of memory, accelerators, and/or other devices) between different devices, server racks, and/or data centers.

In various embodiments, commands received from a host via a CXL protocol port of cache coherent switch on chips 1002 are received and terminated inside the respective cache coherent switch on chips 1002 at the CXL protocol port. Cache coherent switch on chip 1002 may then provide a corresponding command tunneled within the payload of Ethernet frames that are communicated over network 1044. Thus, cache coherent switch on chip 1002 includes a bridging function that is configured to terminate all the read and write commands (e.g., persistent memory flush commands) inside cache coherent switch on chip 1002 and provide corresponding commands over Ethernet.

NICs 1080 may be configured to allow for cache coherent switch on chips 1002s to communicate via network/bus 1044. In certain embodiments, cache coherent switch on chips 1002 may be provided for data flow between accelerators 1006 and NICs 1080 (which may be a Smart NIC) so that NICs 1080 may write directly into accelerator 1006's cache coherent memory. Such data flow allows for sending and/or receiving of cache coherent traffic over network 1044 by accelerators 1006.

The configuration of system 1000 allows for data to be communicated between components within servers 1000A and 1000B as well as between servers 1000A and 1000B without needing to be controlled by CPUs 1004. Furthermore, the components of system 1000 are decoupled from each other, with traffic controlled by respective cache coherent switch on chips 1002.

In a certain embodiments, system 1000 may be configured so that cache coherent traffic stays within respective servers 1000A and 1000B. Cache coherency within each server 1000A/B is resolved by respective CPU 1004. Cache coherent switch on chips 1002 may provide accelerator traffic over network 1044, but in certain such embodiments, such accelerator traffic may be non-cache coherent traffic. The cache coherent traffic is thus never exposed to network 1044.

In certain embodiments, (e.g., with processing core 474 within a cache coherent switch on chip, as described in FIG. 4), cache coherent switch on chips 1002 may be configured to resolve cache coherent traffic among accelerators 1006, as well as resolve cache coherency within CPU 1004. Thus, for example, cache coherent switch on chips 1002 may resolve symmetric coherency between two processing domains based on CXL protocol. The processing core within cache coherent switch on chip may receive and provide cache coherent traffic between the various components of system 1000. Thus, for example, all cache coherent traffic may first be provided to cache coherent switch on chip 1002 and cache coherent switch on chip 1002 may then provide corresponding cache coherent traffic to respective target components. Such a configuration may reduce the cache coherency traffic between accelerators and CPUs, as well as other components within system 1000, increasing the performance of accelerator dominated ML/AI workloads by alleviating the bottleneck of CPUs.

In a further embodiment of providing/receiving cache coherent traffic to accelerator 1006 over network 1044, NIC 1080 may indicate that it is providing cache coherent traffic to accelerator 1006. Upon receipt of such traffic, accelerator 1006 may provide the bias change of the coherent memory line to CPU 1004 (via cache coherent switch on chip 1002). Upon receipt, CPU 1004 may then provide snoop requests to all components within its respective server 1000A/B, and once the cache line is resolved, CPU 1004 provides a line resolved message to the requesting accelerator 1006. Upon receipt of this message, accelerator 1006 may write the received traffic from NIC 1080 into the cache coherent portion of the respective memory 1046 of accelerator 1006.

Typically, accelerator to accelerator traffic within a system is provided via a proprietary switch. Cache coherent switch on chip 1002 allows for the elimination of such a proprietary switch while providing for accelerator to accelerator traffic. Accordingly, CXL protocol data may be provided from a first accelerator 1006 to a cache coherent switch on chip 1002 and communicated to a second accelerator 1006.

In various embodiments, CPU 1004 may include a home agent configured to resolve coherent traffic. Cache coherent traffic may be resolved by the home agent of CPU 1004. However, cache coherency may also be resolved within a processing core (e.g., a processing core such as processing core 1074 of cache coherent switch on chip) of the cache coherent switch on chip, removing CPU 1004 as a bottleneck.

In a typical system, when data arrives from a network, typical data flows include network to processor, processor to storage, storage to processor, and processor to accelerator. As the volume of data grows, the processor becomes a bottleneck in this type of circular cycle of data transfer.

Cache coherent switch on chip 1002 allows for data to flow through to its ultimate destination while bypassing any CPU bottleneck. Thus, cache coherent switch on chip 1002 allows for data transfer between various ports, such as between two downstream ports. Components that are coupled to cache coherent switch on chip 1002 may, accordingly, more easily transfer data between each other and bypass CPU bottlenecks. Such transfers may be of the CXL protocol format.

For data transfers between accelerators and storage devices allocated to a root port of a microprocessor of cache coherent switch on chip 1002, the transfers may be cache coherent (e.g., controlled by the microprocessor), removing the need for cache coherency to be resolved by CPU 1004. Such a configuration provides for bandwidth and latency advantages as CPU 1004 may be bypassed and may be especially beneficial for neural networks, cryptocurrency, and/or other such systems where accelerators, ASICs, and/or other devices are primarily used (e.g., during training or mining).

Each cache coherent switch on chip 1002 may be communicatively/electrically coupled with one or more of a plurality of accelerators 1006. As each cache coherent switch on chip 1002 may be communicatively/electrically coupled to one or more other cache coherent switch on chip 1002, the number of accelerators available to each of the communicatively/electrically coupled cache coherent switch on chips 1002 may be accordingly expanded across a network to encompass accelerators that are coupled to the plurality of cache coherent switch on chips 1002. Variously, cache coherent switch on chip 1002 may provide for such pooling regardless of whether the respective accelerator is assigned to CPU 1004 or a microprocessor of the cache coherent switch on chip 1002 (allowing for operation of the accelerator via cache coherent switch on chip 1002).

Thus, cache coherent switch on chip 1002 allows for creating and managing a pool of CXL protocol attached accelerators or other resources distributed across one or more cache coherent switch on chips 1002. In various embodiments, each cluster of communicatively coupled cache coherent switch on chips 1002 may include their own respective virtual hierarchies and cluster of resources. Resources within each cluster may communicate between each other accordingly as if all are connected to the same switch.

Resources within the pool (such as accelerators) may be allocated/deallocated to any application server inside a rack, aisle, data center, and/or any portion of networked data centers communicatively coupled via CXL protocol (including via CXL protocol over Ethernet or other networks). Applications servers may thus be provided with direct access to all accelerators within a cluster, removing all data transformations that are required in typical architecture (e.g., from CUDA code to RDMA protocol packets and back).

In certain embodiments, traffic passing through a first cache coherent switch on chip may be mirrored on a second cache coherent switch on chip. The mirrored traffic may then be utilized for, for example, analysis of traffic that is provided through the first cache coherent switch on chip.

FIG. 10B illustrates formats of read packet 2000A, read response packet 2000B, write packet 2000C, and write acknowledgment packet 2000D. Such packets may be used for providing resource pooling (e.g., via bridging) and persistent memory functions over Ethernet. Variously, each of packets 2000 may include preamble 2002, DA 2004, SA 2006, type 2008, command 2010, address 2012, and CRC 2016. Read packet 2000A and write acknowledgement packet 2000D may include PAD 2014. Read response packet 2000B may include read data 2018 and write packet 2000C may include write data 2020. The size of each portion of data may be indicated within FIG. 10B.

For read packet 2000A, command 2010 may include a command indicating "PM read" with length data of the packet and the intended address. For read response packet 2000B, command 2010 may indicate "PM response" with the intended address and the read data. CRC 2016 may indicate the full Ethernet frame. Address 2012 may correspond to the persistent memory's address.

For write packet 2000C, command 2010 may indicate a "PM write" with length data of the packet, the intended address, and the write data. For write acknowledgement packet 2000D, command 2010 may indicate a "PM write acknowledgement" and the intended address.

In various embodiments, compression and/or decompression may be utilized and, based on the packets, the same compression and/or decompression algorithm may be utilized for both the read initiator and the target. Compressed data may be inflated at the source and written within memory buffer.

Figure 11:
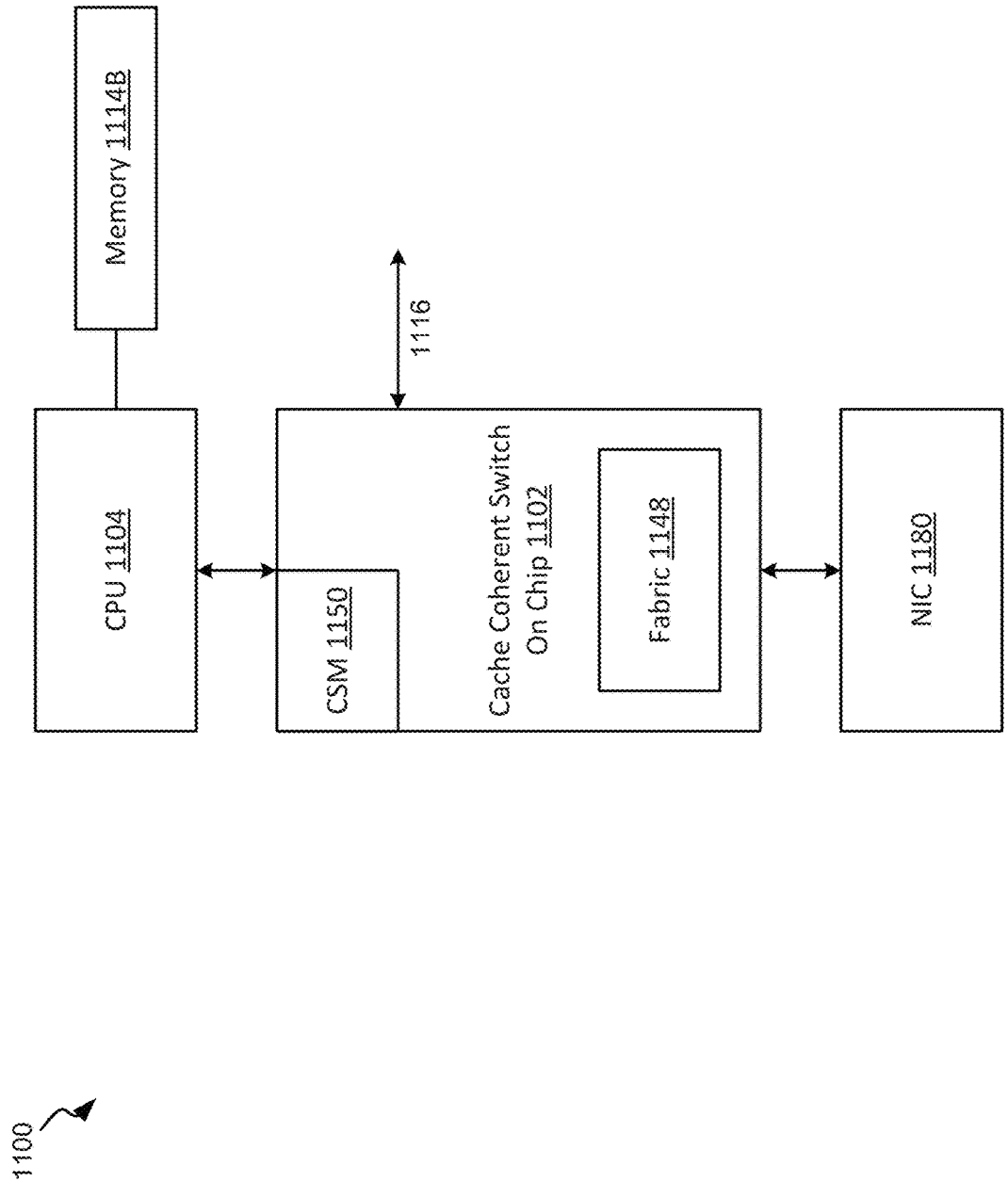
FIG. 11 illustrates a block diagram of an example cache coherent switch on chip with accelerator, in accordance with some embodiments.

FIG. 11 illustrates a block diagram of an example cache coherent switch on chip with accelerator, in accordance with some embodiments. FIG. 11 illustrates system 1100 that includes cache coherent switch on chip 1102, CPU 1104 with memory 1114B, and NIC 1180. Cache coherent switch on chip 1102 includes fabric 1148 and compression and security module (CSM) 1150. CSM 1150 allows for cache coherent switch on chip 1102 to perform compression and decompression for data received.

In certain embodiments, after data arrives within cache coherent switch on chip 1102 from the network (e.g., via NIC 1180), the data is provided to CSM 1150 to be decrypted and/or decompressed. Once the data is decrypted and/or decompressed, such data is then provided to other components through one or more ports of cache coherent switch on chip 1102. Additionally, when data is provided to cache coherent switch on chip 1102 to be provided to the network via NIC 1180, CSM 1150 may first encrypt and/or compress such data before memory buffering and/or providing such data to NIC 1180 (and, thus, the network).

Figure 12:
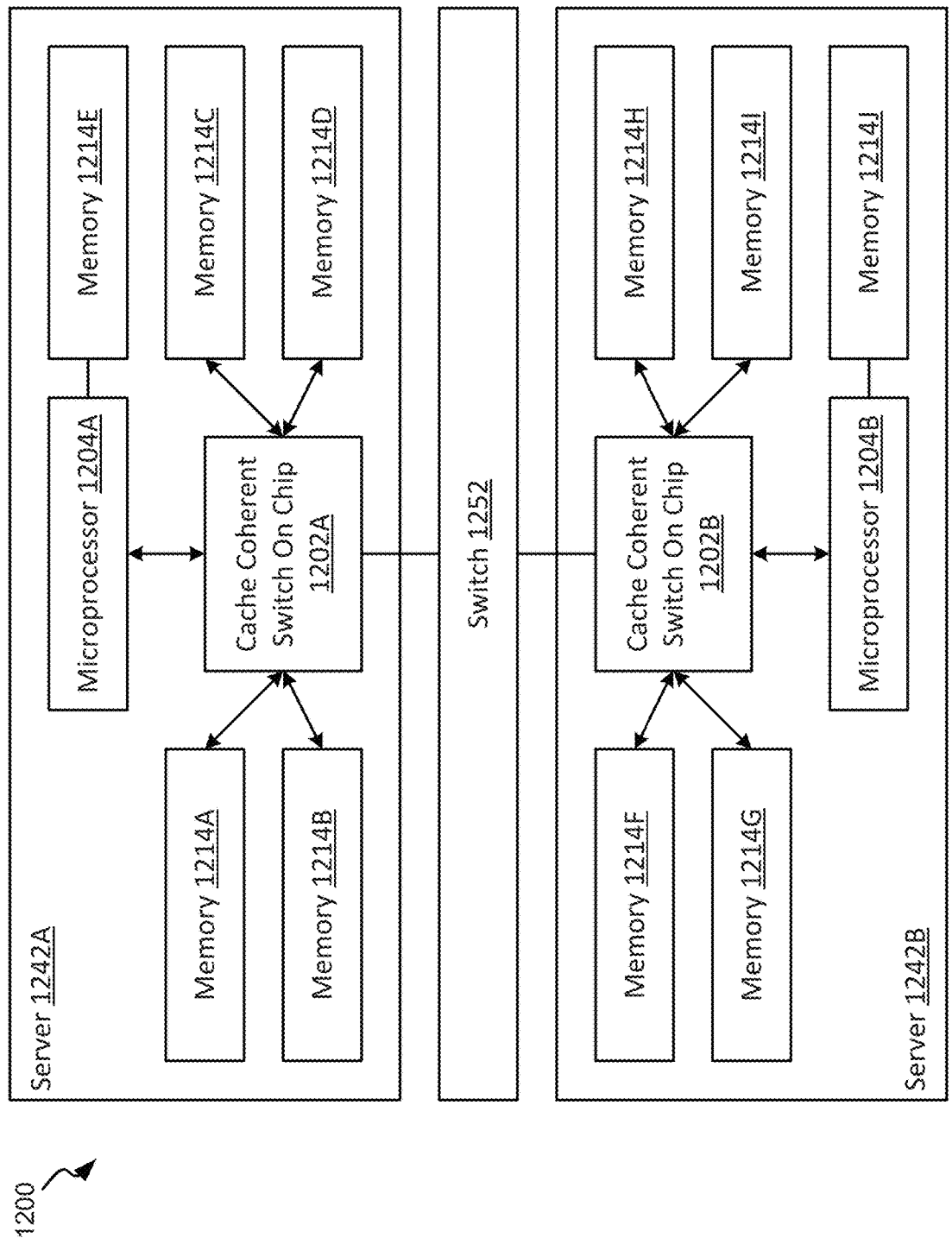
FIGS. 12-14 illustrate block diagrams of further examples, in accordance with some embodiments.
Figure 13A:
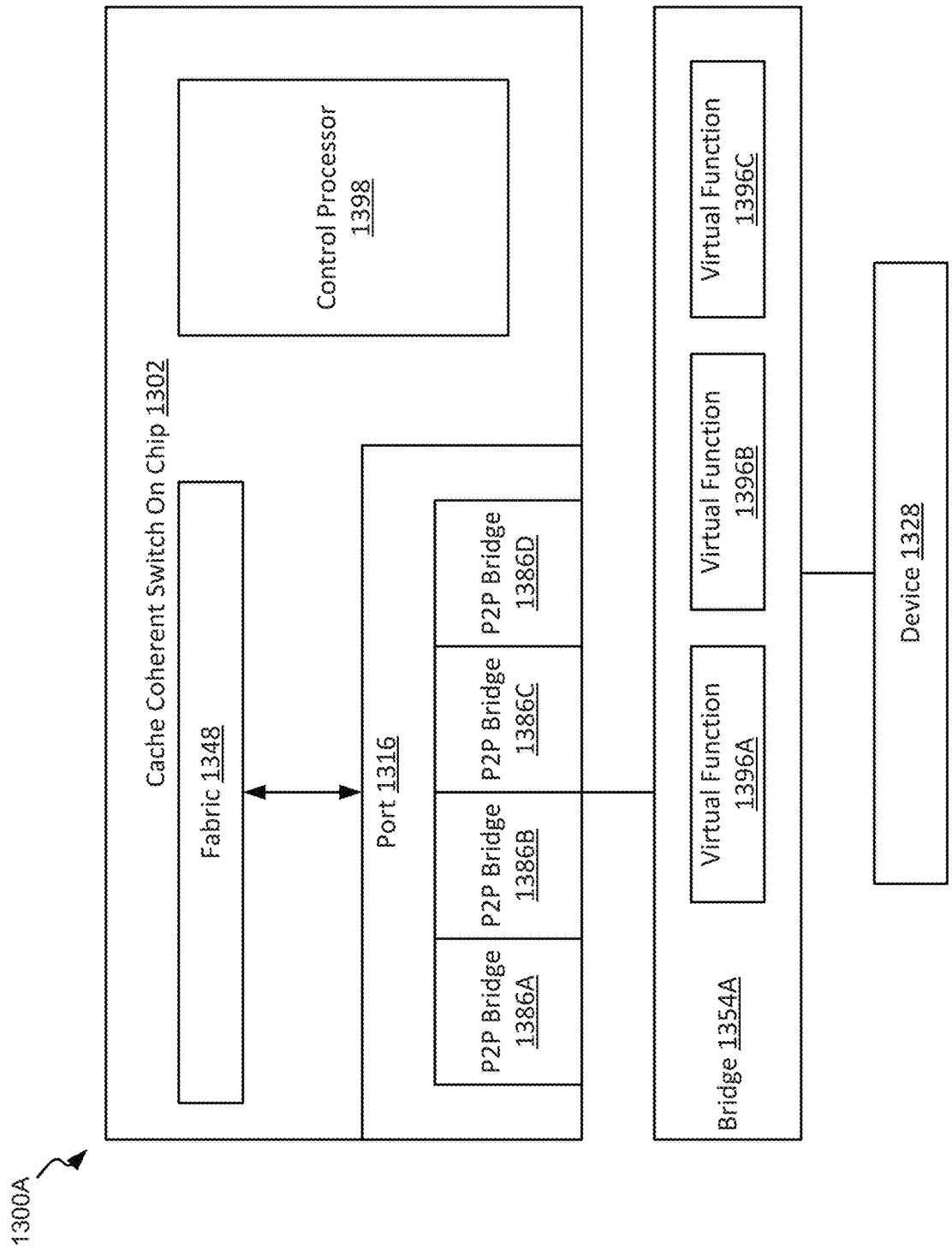
Figure 13B:
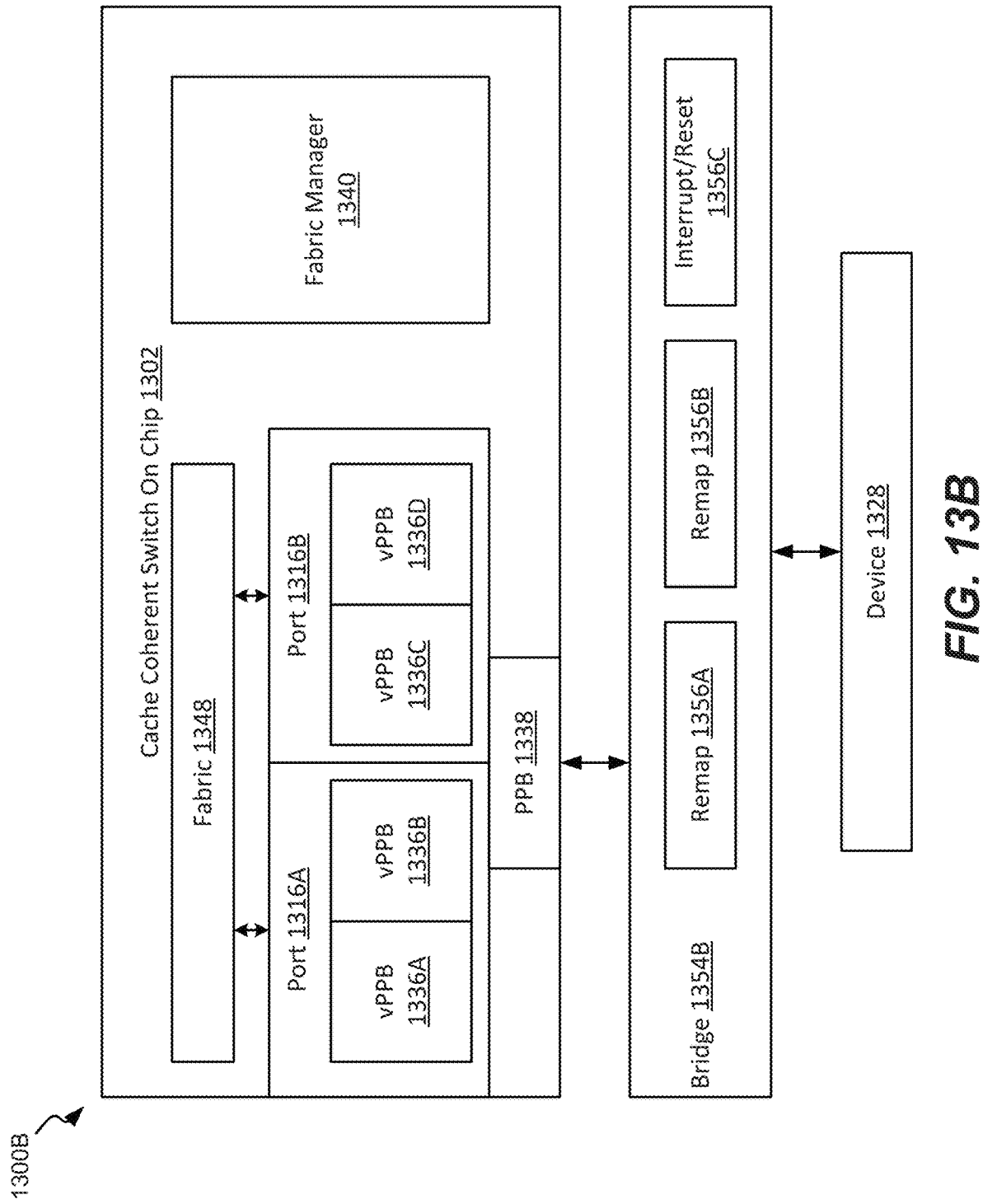
Figure 14:
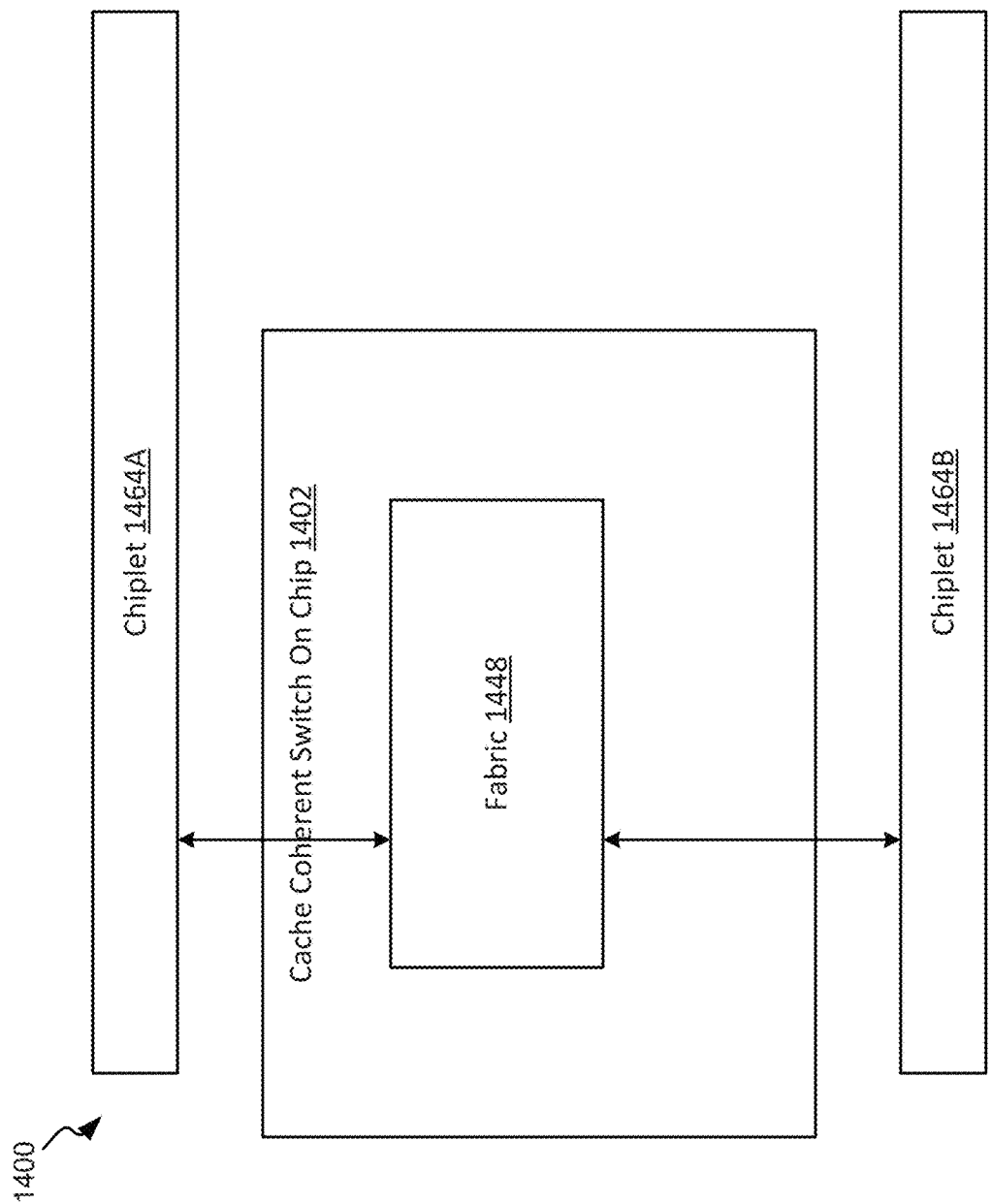

FIGS. 12-14 illustrate block diagrams of further examples, in accordance with some embodiments. FIG. 12 illustrates system 1200 that includes a plurality of servers 1242. Server 1242A and 1242B are communicatively coupled via switch 1252 (e.g., cache coherent switch on chips 1202A and 1202B of servers 1242A and 1242B, respectively, are communicatively coupled via switch 1252). In various embodiments, multiple such servers may be communicatively coupled via fabric switch. Coupling in such a manner may allow for such communicatively coupled servers (e.g., servers 1242A and 1242B) to pool resources such as CXL protocol or CPU socket attached memory, accelerators, and/or other such resources over fabric, increasing the amount of resources available to a system and increasing flexibility. In various embodiments, such resources may be pooled via software controlled, driver, or driver-less techniques.

In a certain instance, server 1242B may wish to share one or more of memories 1214F-J with server 1242A. A driver running within server 1242B may pin such memory through a registration routine and may provide an access key to server 1242A for access to the respective memory. Server 1242A may then access the shared memory via CXL protocol memory commands.

In another instance, server 1242B may share read/write cache buffers with server 1242A. When recalling cached data, server 1242A may first check if the data is available locally. If the data is not available locally, a request for cached data is provided to server 1242B. Server 1242B may then provide the requested cached data either from a cache within memories 1214F-I of server 1242B or from memory 1214J communicatively coupled to microprocessor 1204B.

In other embodiments, two or more servers may be a part of the system. A local server may determine that requested data is not within its own buffer and may then communicate requests for the buffer data to each of the various servers. The various servers may provide erasure code, accordingly to the techniques described herein (e.g., within FIG. 17). The servers receiving the request may each determine whether its own caches include the requested data. Servers that include the data may then provide read responses to the requesting server and the requesting server may then receive erasure code data and replace the missing data blocks. Servers that do not include the data may provide read requests to corresponding memory, update the corresponding caches, and provide the data blocks to the requesting server. The requesting server may then reconstruct such data.

FIGS. 13A and 13B illustrate system 1300 that includes downstream bridges for supporting legacy devices. Systems 1300 of FIGS. 13A and 13B include cache coherent switch on chip 1302 and bridge 1354. Bridge 1354 may be, for example, a single root to multi root (SR2MR) or single logical device to multiple logical device (SLD2MLD) bridge. Bridge 1354 may be configured to expose a single device (e.g., device 1328) to multiple host ports.

In the embodiment of FIG. 13A, bridge 1354A may be a SR2MR bridge. In various embodiments, port 1316 may be communicatively coupled to bridge 1354A via a PCI protocol. Bridge 1354A may be accordingly communicatively coupled to device 1328 via the PCI protocol. Bridge 1354A may be implemented within cache coherent switch on chip 1302 or as a separate chip.

Bridge 1354A may include a plurality of virtual function assignments 1396A-C. Port 1316 may be coupled to device 1328 via bridge 1354A. Port 1316 may include a plurality of P2P bridges 1386A-D. Each virtual function 1396 may be associated with a corresponding P2P bridge 1386. Each virtual function 1396 may include address remap logic. In certain embodiments, port 1316 may implement physical function assignment logic to control processor 1398. Due to the matched virtual functions 1396 of bridge 1354A to P2P bridges 1386 of port 1316, device 1328 may be associated with a plurality of roots (e.g., multi-roots). The configuration of system 1300A may be utilized for single root devices and may provide for the implementation of multi-root devices while providing the security and isolation of separate virtual hierarchies.

In the embodiment of FIG. 13B, bridge 1354B may be a SLD2MLD bridge. Bridge 1354B may be implemented within cache coherent switch on chip 1302 or as a separate chip. Bridge 1354B may be communicatively coupled to PPB 1338 and, accordingly, vPPBs 1336. Bridge 1354B may provide a plurality of address remaps 1356A/B as well as provide for assignment logic such as for interrupts and resets with 1356C. Thus, single logic device 1328 coupled to bridge 1354B may be virtualized into a multi-logic device. A single logic device 1328 may be accordingly associated with a plurality of vPPBs 1336 and available as a resource and/or utilize resources from a plurality of other devices communicatively coupled to cache coherent switch on chip 1302. Utilizing the configuration of system 1300B, a single logic device may be shared and become, effectively, a multi-logic device and obtain the security and isolation benefits of a multi-logic device with a plurality of virtual hierarchies.

FIG. 14 illustrates system 1400 with cache coherent switch on chip 1402 with fabric 1448 of cache coherent switch on chip 1402 coupled to chiplets 1464. In certain embodiments, chiplet 1464 may be a memory controller chiplet that increases the efficiency and reduces the latency of memory. In other embodiments, chiplets 1464 may be other types of chiplets, such as AI inference engines, FPGAs, GPU accelerators, edge computing devices, and/or other such devices.

Figure 15:
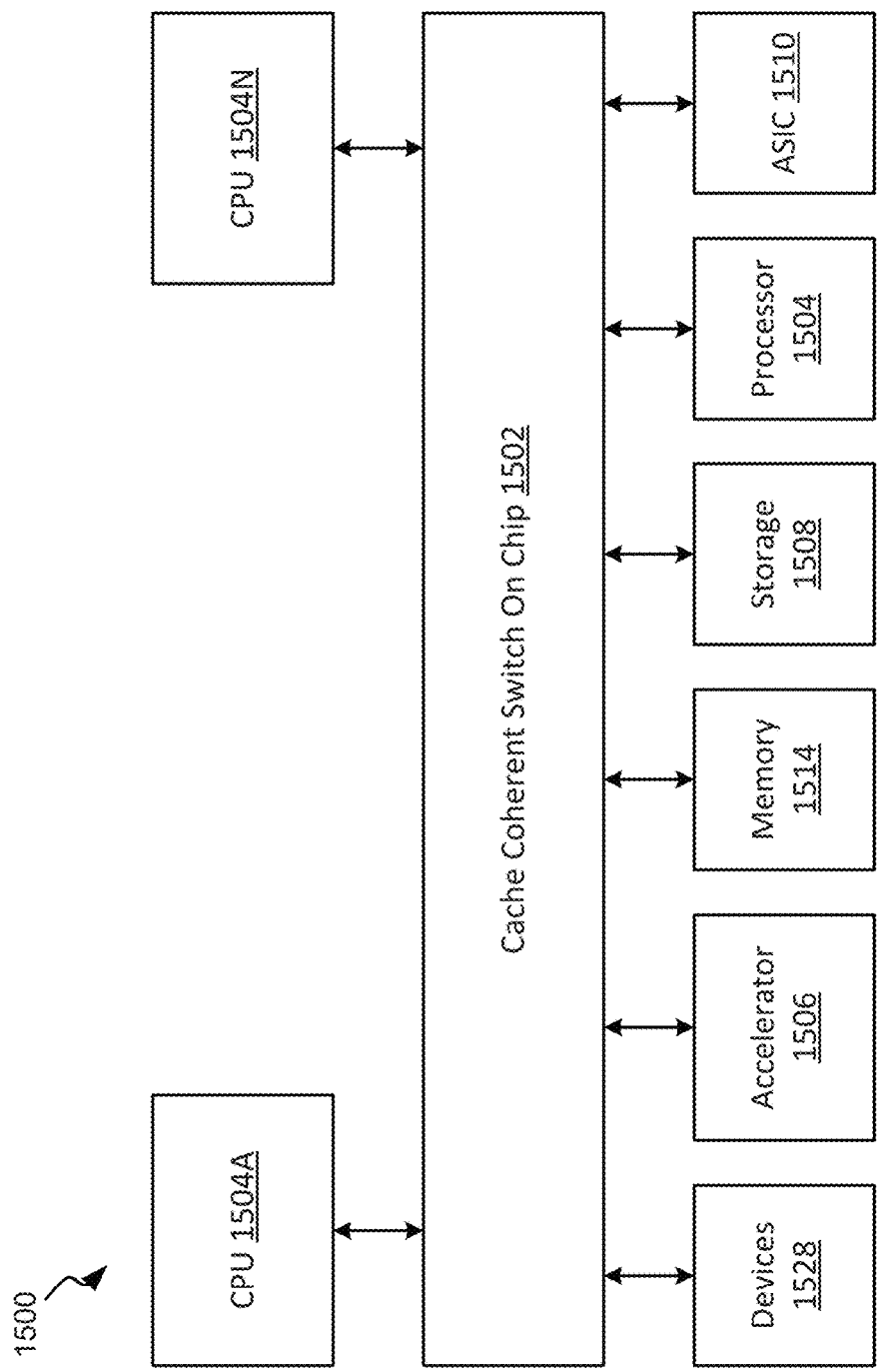
FIG. 15 illustrates a block diagram of an example computing system with a cache coherent switch on chip, in accordance with some embodiments.

FIG. 15 illustrates a block diagram of an example computing system with a cache coherent switch on chip, in accordance with some embodiments. FIG. 15 illustrates system 1500 that includes cache coherent switch on chip 1502. Cache coherent switch on chip 1502 may be communicatively coupled to a resource pool. The resource pool may include a plurality of CPUs 1504A-N, devices 1528, accelerator 1506, memory 1514, storage 1508, processor 1504, and ASIC 1510. Such communicative coupling may be via a CXL protocol. Such resource pools may be within a server, within a data center, and/or communicatively coupled via Ethernet, the Internet, and/or another data connection (e.g., Bluetooth or satellite Internet).

As described herein, cache coherent switch on chip 1502 may be configured to assign one or more resources from the resource pool to applications on demand. When the application no longer requires the assigned resources, the resources may be reallocated available for other applications.

Figure 16:
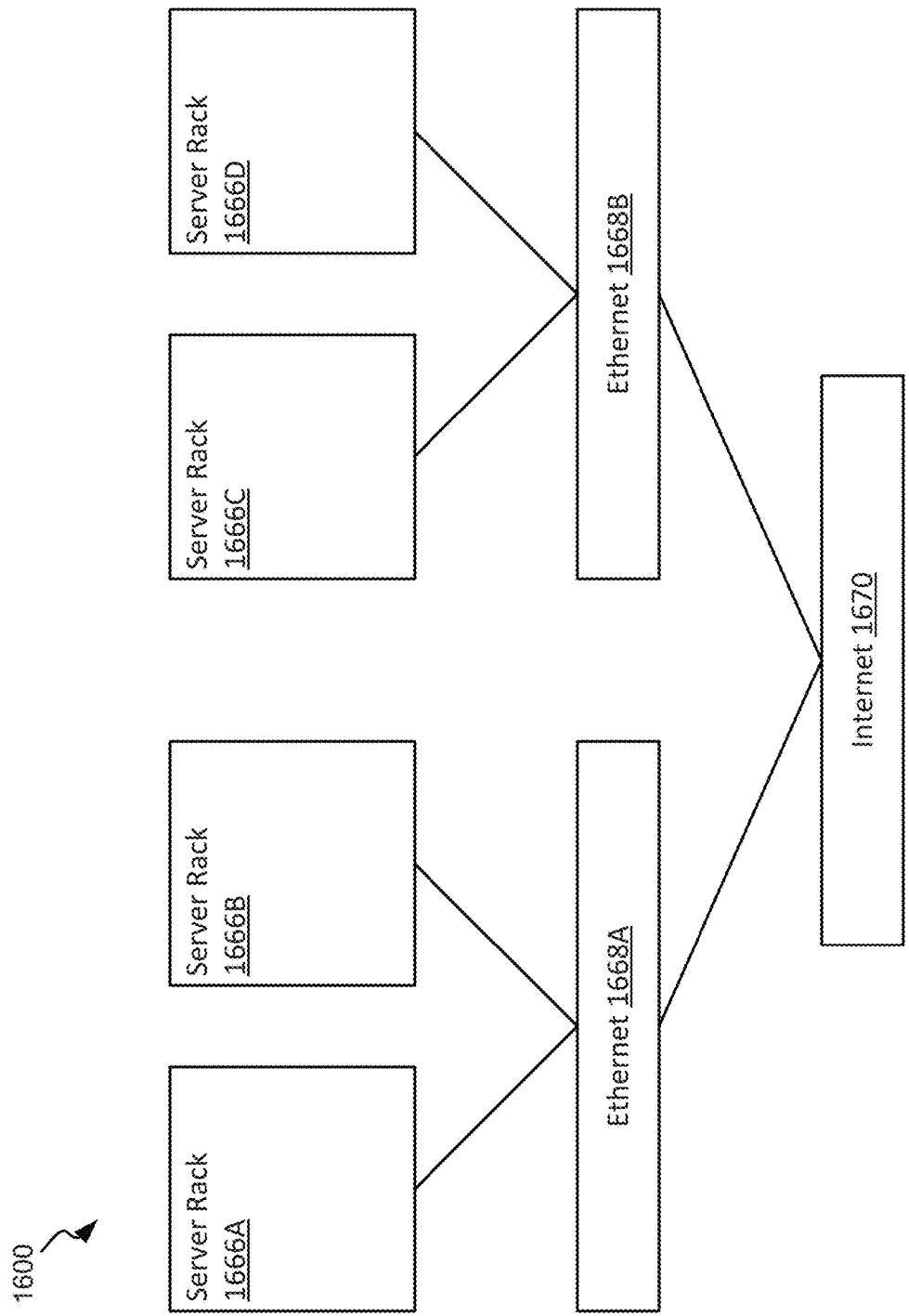
FIG. 16 illustrates a block diagram of a networked system, in accordance with some embodiments.

FIG. 16 illustrates a block diagram of a networked system, in accordance with some embodiments. Networked system 1600 may include a plurality of server racks 1666. Server racks 1666A and 1666B may be communicatively coupled via Ethernet 1668A and server racks 1666C and 1666D may be communicatively coupled via Ethernet 1668B. Ethernet 1668A and 1668B may be communicatively coupled via Internet 1670. Accordingly, server racks 1666A-D may all be communicatively coupled with each other.

Each of server racks 1666A-D may include their respective cache coherent switch on chips. Resource clusters may be created from devices communicatively coupled to the respective cache coherent switch on chips within a server rack (e.g., within one of server racks 1666A to D), from devices communicatively coupled via Ethernet 1668, from devices communicatively coupled via Internet 1670, and/or communicatively coupled via another technique. Accordingly, the cache coherent switch on chip disclosed herein allows for the creation of any resource cluster within a system, within a server rack, and across the server racks, creating completely fungible resources connected via a high speed CXL network or CXL protocol over fabric.

Figure 17:
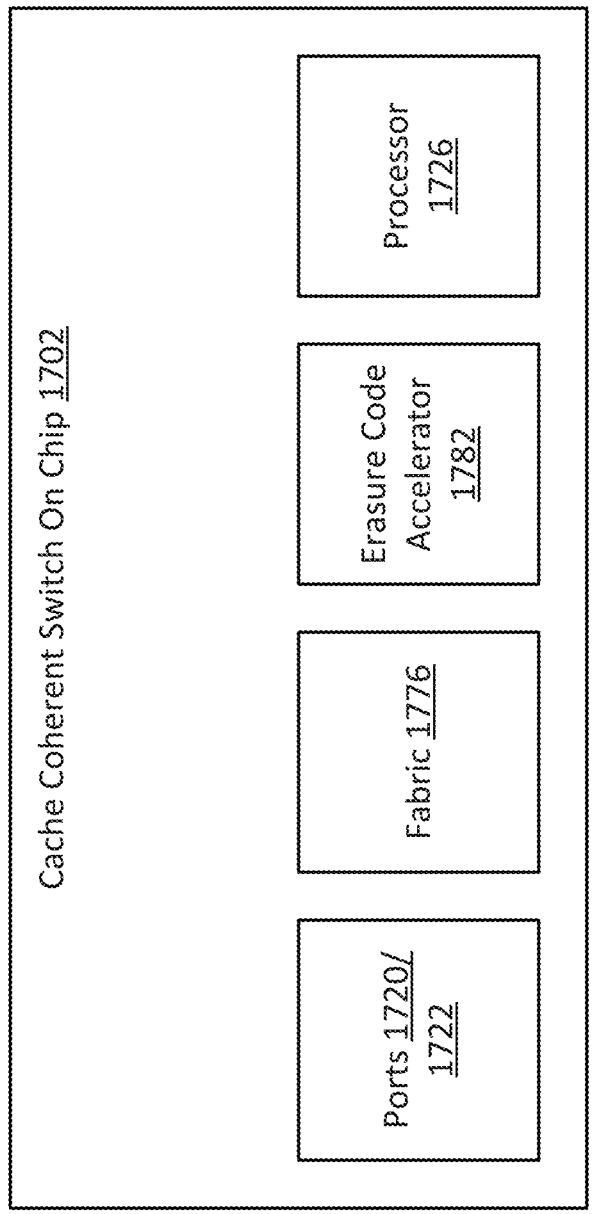
FIG. 17 illustrates a block diagram of an example cache coherent switch on chip with erasure code accelerator, in accordance with some embodiments.

FIG. 17 illustrates a block diagram of an example cache coherent switch on chip with erasure code accelerator, in accordance with some embodiments. FIG. 17 illustrates cache coherent switch on chip 1702 with ports 1720/1722, fabric 1776, erasure code accelerator 1782, and processor 1726.

Erasure code accelerator 1782 may provide redundancy for data stored in persistent memory, non-volatile memory, random access memory, and/or other such memory communicatively coupled to cache coherent switch on chip 1702 or across a network that cache coherent switch on chip 1702 is communicatively coupled to with other cache coherent switch on chips.

Thus, erasure code accelerator 1782 may be communicatively coupled to processor 1726 and/or to memory or storage communicatively coupled to ports 1720/1722. In situations where erasure code accelerator 1782 is communicatively coupled to processor 1726, erasure code accelerator 1782 may perform read/write requests addressed to processor 1726. Erasure code accelerator 1782 thus stripes data across one or more non-volatile memory on writes and reconstructs data from such memory during reads. In the event of a non-volatile memory failure, erasure code accelerator 1782 may support reconstruction of any lost data.

In certain embodiments, cache coherent switch on chip 1702 may receive a write data flow. For a write data flow received by cache coherent switch on chip 1702, a check may be performed to determine whether the write data is assigned a virtual end point (e.g., a memory or I/O device) in a virtual hierarchy. If the write is for the virtual end point, fabric 1776 may provide the data to processor 1726. Processor 1726 may then provide the write request to erasure code accelerator 1782, identifying the port associated with the request and the erasure code technique for use. Data may then read from various CXL protocol ports of cache coherent switch on chip 1702, allowing for erasure coding to be accordingly performed by erasure code accelerator 1782 by modifying the data and recalculating the erasure coded data. The modified erasure coded data is then written to the respective CXL port (e.g., the ports where the data is read from the various CXL protocol ports). Such a technique may conserve processing resources by offloading erasure coding to erasure code accelerator 1782.

Erasure code accelerator 1782 may also provide a read data flow. In a certain embodiment, ingress logic (e.g., for a read request from a port of cache coherent switch on chip 1702) determines whether the read data flow has erasure code implemented. If erasure code has been implemented, the read request may be provided to processor 1726. Processor 1726 may then provide the read request to erasure code accelerator 1782. The read request may identify the port (and, thus, the device communicatively coupled to the port) where the read request was received. The requested read data may then be read from various CXL protocol ports of cache coherent switch on chip 1702, allowing for erasure coding to be accordingly performed by erasure code accelerator 1782 to prepare new erasure coded data. The erasure coded data is then provided back to the respective requesting CXL port.

The various accelerators of cache coherent switch on chip 1702 (e.g., compression, security, erasure coding, and/or other such accelerators) and processor 1726 of cache coherent switch on chip 1702 may be utilized for provisioning of computational storage services (CSSes) to applications running on host CPUs (e.g., CPUs of the greater system containing cache coherent switch on chip 1702). For example, processor 1726 and CSM modules may serve as computational storage processors (CSPs) to provide CSSes to attached hosts. Processor 1726 may also be utilized as the host in computational storage use cases, orchestrating data movement and running of CSSes. In certain embodiments, processor 1726 may offload batch processing of CSS commands from the host CPUs.

Any of the disclosed embodiments may be embodied in various types of hardware, software, firmware, computer readable media, and combinations thereof. For example, some techniques disclosed herein may be implemented, at least in part, by non-transitory computer-readable media that include program instructions, state information, etc., for configuring a computing system to perform various services and operations described herein. Examples of program instructions include both machine code, such as produced by a compiler, and higher-level code that may be executed via an interpreter. Instructions may be embodied in any suitable language such as, for example, Java, Python, C++, C, HTML, any other markup language, JavaScript, ActiveX, VBScript, or Perl. Examples of non-transitory computer-readable media include, but are not limited to: magnetic media such as hard disks and magnetic tape; optical media such as flash memory, compact disk (CD) or digital versatile disk (DVD); magneto-optical media; and other hardware devices such as read-only memory ("ROM") devices and random-access memory ("RAM") devices. A non-transitory computer-readable medium may be any combination of such storage devices.

In the foregoing specification, various techniques and mechanisms may have been described in singular form for clarity. However, it should be noted that some embodiments include multiple iterations of a technique or multiple instantiations of a mechanism unless otherwise noted. For example, a system uses a processor in a variety of contexts but can use multiple processors while remaining within the scope of the present disclosure unless otherwise noted. Similarly, various techniques and mechanisms may have been described as including a connection between two entities. However, a connection does not necessarily mean a direct, unimpeded connection, as a variety of other entities (e.g., bridges, controllers, gateways, etc.) may reside between the two entities.

In the foregoing specification, reference was made in detail to specific embodiments including one or more of the best modes contemplated by the inventors. While various embodiments have been described herein, it should be understood that they have been presented by way of example only, and not limitation. For example, some techniques and mechanisms are described herein in the context of fulfillment. However, the disclosed techniques apply to a wide variety of circumstances. Particular embodiments may be implemented without some or all of the specific details described herein. In other instances, well known process operations have not been described in detail in order not to unnecessarily obscure the techniques disclosed herein. Accordingly, the breadth and scope of the present application should not be limited by any of the embodiments described herein, but should be defined only in accordance with the claims and their equivalents.

The invention claimed is:

1. A cache coherent switch on chip comprising:
a plurality of ports, each port configured to communicatively couple to an associated component of a plurality of components and configured to support a Compute Express Link (CXL) protocol;
switched fabric circuitry, communicatively coupled to the plurality of ports and comprising:
switched fabric circuitry configured in a mesh network comprising a plurality of nodes; and
a microprocessor, communicatively coupled to the switched fabric circuitry and comprising:
a fabric manager, configured to allocate and/or deallocate resources to one or more of the plurality of ports and;
wherein the cache coherent switch on chip is configured to share resources between the plurality of components utilizing the CXL protocol over a CXL interface while bypassing a central processing unit to share the resources.

2. The cache coherent switch on chip of claim 1, wherein the cache coherent switch on chip further comprises:
a plurality of virtual hierarchies, wherein the fabric manager is configured to:
determine that a first component has been coupled to a first port; and
assign the first component to a first virtual hierarchy.

3. The cache coherent switch on chip of claim 2, wherein the first port comprises a plurality of virtual PCI-to-PCI bridges (vPPB) and a first PCI-to-PCI bridge (PPB), wherein the first component is associated with a PPB, and wherein the fabric manager is further configured to:

determine an attribute associated with the first component, wherein the assigning the first component to the first virtual hierarchy is based on the attribute;
assign the first component to a first vPPB based on the attribute; and
bind the first vPPB to the first PPB.

4. The cache coherent switch on chip of claim 1, wherein the plurality of ports comprises an upstream port, a first downstream port, and a second downstream port, wherein the fabric manager is further configured to:
receive a signal from the upstream port; and
direct the signal to the first downstream port.

5. The cache coherent switch on chip of claim 1, wherein the fabric manager is implemented within firmware of the microprocessor.

6. The cache coherent switch on chip of claim 1, wherein the processor is configured to:
detect, via the switched fabric circuitry, that a component has been hot-inserted; and
assign, with the fabric manager, the hot-inserted component to a first port of the plurality of ports.

7. The cache coherent switch on chip of claim 6, wherein the first component is associated with a PCI-to-PCI bridge (PPB), and wherein the assigning the hot-inserted component to the first port comprises:
assigning the hot-inserted component to a first virtual hierarchy; and
binding a PPB to a first virtual PCI-to-PCI bridge (vPPB).

8. The cache coherent switch on chip of claim 6, wherein the processor is further configured to:
perform diagnostics on the component, wherein the assigning the component to the first port is based on the diagnostics.

9. The cache coherent switch on chip of claim 1, wherein the plurality of ports is communicatively coupled to a plurality of devices, each of the plurality of devices comprising a device cache, and wherein the microprocessor is configured to:
determine, based on the plurality of devices, a cache priority for the plurality of devices; and
manipulate the device caches according to the cache priority.

10. The cache coherent switch on chip of claim 9, wherein the manipulating the device caches comprises one or more of fetching, reading, or writing cache data.

11. The cache coherent switch on chip of claim 9, wherein the microprocessor is further configured to:
cache first data with at least one of the device caches;
receive a request for the first data, the request comprising tag RAM;
perform, through the tag RAM, a look-up for the first data of all of the plurality of device caches;
determine, based on the look-up, the cache location of the first data within the plurality of device caches;
access the first data; and
provide the first data.

12. The cache coherent switch on chip of claim 1, further comprising:
a machine learning memory prefetcher, configured to predict addresses of access to memory coupled to one or more of the plurality of ports and prefetch data from the memory, wherein the prediction is based on an identity of applications communicatively coupled to the one or more of the plurality of ports.

13. The cache coherent switch on chip of claim 1, wherein the fabric manager is configured to communicate with a management software entity and receive instructions from the management software entity.

14. The cache coherent switch on chip of claim 1, wherein the associated component is one of a memory, an accelerator, an application specific integrated circuit, and/or storage.

15. The cache coherent switch on chip of claim 1, further comprising:
the associated component.

16. A system comprising:
a first server device comprising:
a first memory device; and
a first cache coherent switch on chip, communicatively coupled to the first memory device, wherein the first cache coherent switch on chip comprises:
a plurality of ports, each port configured to communicatively couple to an associated component of a plurality of components and configured to support a Compute Express Link (CXL) protocol;
switched fabric circuitry, communicatively coupled to the plurality of ports and comprising:
switched fabric circuitry configured in a mesh network comprising a plurality of nodes; and
a microprocessor, communicatively coupled to the switched fabric circuitry and comprising:
a fabric manager, configured to allocate and/or deallocate resources to one or more of the plurality of ports;
wherein the cache coherent switch on chip is configured to share resources between the plurality of components utilizing the CXL protocol over a CXL interface while bypassing a central processing unit to share the resources.

17. The system of claim 16, wherein the first cache coherent switch on chip further comprises a Random Access Memory (RAM) module, and wherein the system further comprises:
a DDR module communicatively coupled to the first cache coherent switch on chip via at least a first port of the plurality of ports;
persistent memory communicatively coupled to the first cache coherent switch on chip via at least a second port of the plurality of ports; and
a solid state drive communicatively coupled to the first cache coherent switch on chip via at least a third port of the plurality of ports.

18. The system of claim 17, wherein the DDR module is external memory communicatively coupled via switch fabric.

19. The system of claim 17, wherein the DDR module comprises DDR4 or DDR5 Synchronous Dynamic Random Access Memory (SDRAM).

20. The system of claim 16, further comprising:
a second server device, communicatively coupled to the first server device via a data connection, the second server device comprising:
a second memory device; and
a second cache coherent switch on chip.

* * * * *